(12) United States Patent
Yan et al.

(10) Patent No.: US 12,496,023 B2
(45) Date of Patent: Dec. 16, 2025

(54) SYSTEMS AND METHODS FOR X-RAY IMAGING

(71) Applicant: SHANGHAI UNITED IMAGING HEALTHCARE CO., LTD., Shanghai (CN)

(72) Inventors: Jing Yan, Shanghai (CN); Zhou Yuan, Shanghai (CN); Peng Yao, Shanghai (CN); Juan Feng, Shanghai (CN); Xuefei Lu, Shanghai (CN); Guanji Leng, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 232 days.

(21) Appl. No.: 18/145,833

(22) Filed: Dec. 22, 2022

(65) Prior Publication Data
US 2023/0125320 A1 Apr. 27, 2023

Related U.S. Application Data

(63) Continuation of application No. PCT/CN2021/080940, filed on Mar. 16, 2021.

(30) Foreign Application Priority Data

Jun. 22, 2020 (CN) .......................... 202010575955.5
Oct. 29, 2020 (CN) .......................... 202011185982.8

(51) Int. Cl.
*A61B 6/00* (2024.01)
*A61B 6/40* (2024.01)
*A61B 6/58* (2024.01)

(52) U.S. Cl.
CPC ............ *A61B 6/4007* (2013.01); *A61B 6/582* (2013.01)

(58) Field of Classification Search
None
See application file for complete search history.

(56) References Cited

U.S. PATENT DOCUMENTS 6,618,466 B1 * 9/2003 Ning .................... A61B 6/5235
378/7
7,396,162 B1 * 7/2008 Edic ...................... G01T 1/1647
378/207

(Continued)

FOREIGN PATENT DOCUMENTS

CN 101158853 A 4/2008
CN 101987021 A 3/2011
(Continued)

OTHER PUBLICATIONS

International Search Report in PCT/CN2021/080940 mailed on Jun. 23, 2021, 7 pages.
(Continued)

*Primary Examiner* — Hoon K Song
(74) *Attorney, Agent, or Firm* — METIS IP LLC

(57) ABSTRACT

The present disclosure provides a system for imaging via an imaging device including a plurality of radiation sources. Each of at least a portion of the plurality of radiation sources may be configured with a beam stop array that is configured to block at least a portion of radiation beams emitted by the radiation source. For one of the at least a portion of the plurality of radiation sources, the system may determine, based on a scatter distribution, first image data, and second image data, third image data of a subject corresponding to each of the at least a portion of the plurality of radiation sources. For each of at least a portion of the plurality of radiation sources, the system may further determine, based on image data of the subject, target image data of the subject using a calibration model.

20 Claims, 16 Drawing Sheets

(56) References Cited

U.S. PATENT DOCUMENTS

| | | | |
|---|---|---|---|
| 10,881,374 B2* | 1/2021 | Aspelund | A61B 6/502 |
| 2006/0025677 A1* | 2/2006 | Verard | A61B 5/062 |
| | | | 600/423 |
| 2008/0226020 A1 | 9/2008 | Proksa | |
| 2009/0022264 A1 | 1/2009 | Zhou et al. | |
| 2009/0232270 A1* | 9/2009 | Okunuki | A61B 6/482 |
| | | | 378/124 |
| 2009/0232272 A1 | 9/2009 | Tsujii et al. | |
| 2011/0064190 A1 | 3/2011 | Ruimi et al. | |
| 2012/0263360 A1 | 10/2012 | Zhu et al. | |
| 2014/0241489 A1 | 8/2014 | Zhang et al. | |
| 2017/0116762 A1 | 4/2017 | Lin et al. | |
| 2019/0029632 A1 | 1/2019 | Yang et al. | |
| 2019/0066268 A1* | 2/2019 | Song | G06N 3/045 |
| 2021/0183062 A1 | 6/2021 | Fukuda | |

FOREIGN PATENT DOCUMENTS

| | | |
|---|---|---|
| CN | 102068270 A | 5/2011 |
| CN | 102631208 A | 8/2012 |
| CN | 103006251 A | 4/2013 |
| CN | 106667512 A | 5/2017 |
| CN | 107516330 A | 12/2017 |
| CN | 108030501 A | 5/2018 |
| CN | 108201447 A | 6/2018 |
| CN | 110353713 A | 10/2019 |
| CN | 110660111 A | 1/2020 |
| CN | 110914868 A | 3/2020 |
| CN | 111685784 A | 9/2020 |
| CN | 112294349 A | 2/2021 |

OTHER PUBLICATIONS

Written Opinion in PCT/CN2021/080940 mailed on Jun. 23, 2021, 7 pages.
Alejandro Rodríguez Ruiz, Artificial Intelligence & Tomosynthesis for Breast Cancer Detection, Radboud University Nijmegen, 2019, 253 pages.
The Extended European Search Report in European Application No. 21829408.0 mailed on Sep. 7, 2023, 8 pages.

* cited by examiner

800

```
For each of at least a portion of a plurality of radiation sources,
obtaining image data of a subject acquired by an imaging          ─ 810
device via scanning the subject based on radiation beams
emitted by the radiation source
```

```
For each of at least a portion of the plurality of radiation
sources, obtaining a correction model corresponding to the
radiation source, the correction model indicating a transform    ─ 820
relationship between a position of each pixel in the image data
and a position of a portion of the subject represented by the
pixel in a space
```

```
Determining, based on the image data on the subject, target     ─ 830
image data of the subject
```

```
Obtaining image data of a subject acquired by an imaging
device via scanning the subject based on radiation beams
emitted by a radiation source, the image data including scatter
data caused by a scattering of at least a portion of the
radiation beams passing through the subject
```
⟶ 1810

```
Obtaining a trained machine learning model
```
⟶ 1820

```
Determining, based on the trained machine learning model
and the image data, corrected image data of the subject
corresponding to the radiation source, the corrected image
data including an image quality higher than an image quality
of the image data caused by the scatter data included in the
image data
```
⟶ 1830

FIG. 18

SYSTEMS AND METHODS FOR X-RAY IMAGING

CROSS-REFERENCE TO RELATED APPLICATIONS

This application is a Continuation of International Application No. PCT/CN2021/080940 filed on Mar. 16, 2021, which claims priority of Chinese Patent Application No. 202010575955.5 filed on Jun. 22, 2020, and Chinese Patent Application No. 202011185982.8 filed on Oct. 29, 2020, the contents of each of which are hereby incorporated by reference.

TECHNICAL FIELD

The disclosure generally relates to X-ray imaging systems, and more particularly relates to systems and methods for imaging using an X-ray imaging device including a plurality of radiation sources.

BACKGROUND

X-rays have been widely used in medical diagnosis, radiotherapy planning, surgery planning, radiotherapy, and other medical procedures. In some embodiments, using an X-ray imaging technique, one single radiation source may move or rotate in the acquisition of imaging data to acquire the imaging data under different angles of the single radiation source, which increases scanning time. And a motion artifact caused by, e.g., motion of the radiation source, time delay caused by a thermionic emission mechanism of the radiation source, etc., may reduce a spatial resolution of the imaging data, thereby decreasing the image quality. A planar array imaging technique may avoid the motion of the signal radiation source, thereby greatly reducing the motion artifact in imaging data. However, using the planar array imaging technique, image degradation may be caused by scattering. In addition, geometric parameters of an imaging device may change caused by mechanical accuracy errors during the service of the imaging device, which causes poor image quality. Therefore, it is desired to provide systems and methods for imaging for the planar array imaging technique with improved efficiency and accuracy.

SUMMARY

According to a first aspect of the present disclosure, a system for imaging via an imaging device including a plurality of radiation sources is provided. Each of at least a portion of the plurality of radiation sources may be configured with a beam stop array that is configured to block at least a portion of radiation beams emitted by the radiation source. The system may include at least one storage device storing executable instructions, and at least one processor in communication with the at least one storage device. When executing the executable instructions, the at least one processor may cause the system to perform one or more of the following operations. For one of the at least a portion of the plurality of radiation sources, the operations may include obtaining first image data of a subject acquired by the imaging device when the beam stop array is arranged on a path of radiation beams emitted by the radiation source. For one of the at least a portion of the plurality of radiation sources, the operations may include obtaining second image data of the subject acquired by the imaging device when the beam stop array is not arranged on the path of radiation beams emitted by the radiation source. For one of the at least a portion of the plurality of radiation sources, the operations may also include determining, based on the first image data, a scatter distribution associated with the subject included in the second image data. For one of the at least a portion of the plurality of radiation sources, the operations may further include determining, based on the scatter distribution and the second image data, third image data of the subject corresponding to each of the at least a portion of the plurality of radiation sources.

In some embodiments, the imaging device may include a digital breast tomosynthesis (DBT) device.

In some embodiments, the beam stop array may include a support and multiple elements. Each of multiple elements may include a material with an attenuation coefficient exceeding an attenuation coefficient of a material of the support.

In some embodiments, the determining, based on the first image data, a scatter distribution associated with the subject may include performing an interpolation operation on the first image data to obtain the scatter distribution.

In some embodiments, a radiation dose of the first image data may be less than a radiation dose of the second image data.

In some embodiments, the determining, based on the scatter distribution and the second image data, third image data of the subject corresponding to each of the at least a portion of the plurality of radiation sources radiation source may include determining a ratio of the radiation dose of the second image data and the radiation dose of the first image data; and determining, based on the ratio, the scatter distribution, and the second image data, the third image data.

In some embodiments, the plurality of radiation sources may include a target portion in which each radiation source is not configured with a beam stop array. The operations may include, for a radiation source in the target portion, obtaining fourth image data of the subject acquired by the imaging device via scanning the subject. The operations may include, for a radiation source in the target portion, determining an estimated scanner distribution included in the fourth image data based on one or more scatter distributions that are determined based on the first image data corresponding to one or more reference radiation sources. The operations may further include, for a radiation source in the target portion, determining, based on the fourth image data and the scanner distribution, third image data of the subject corresponding to the radiation source in the target portion.

In some embodiments, the determining an estimated scanner distribution included in the fourth image data may include determining the estimated scanner distribution included in the fourth image data by performing an interpolation operation on the one or more scatter distributions.

In some embodiments, the operations further include determining, based on the third image data of the subject corresponding to each of the plurality of radiation sources, target image data of the subject.

According to a second aspect of the present disclosure, a system for imaging via an imaging device including a plurality of radiation sources is provided. Each of at least a portion of the plurality of radiation sources may be configured with a beam stop array that is configured to block at least a portion of radiation beams emitted by the radiation source. The system may include at least one storage device storing executable instructions, and at least one processor in communication with the at least one storage device. When executing the executable instructions, the at least one processor may cause the system to perform one or more of the following operations. For one of the plurality of radiation sources, the operations may include obtaining image data of the subject acquired by the imaging device via scanning the subject based on radiation beams emitted by the radiation source. The image data may include scatter data caused by a scattering of at least a portion of the radiation beams passing through the subject. For one of the plurality of radiation sources, the operations may also include obtaining a trained machine learning model. For one of the plurality of radiation sources, the operations may further include determining, based on the trained machine learning model and the image data, target image data of the subject corresponding to the radiation source. The target image data may include an image quality higher than an image quality of the image data caused by the scatter data included in the image data.

In some embodiments, the determining, based on the trained machine learning model and the image data, target image data of the subject corresponding to the radiation source may include determining a scatter distribution associated with the subject by inputting the image data into the trained machine learning model; and determining, based on the scatter distribution and the image data, the target image data.

In some embodiments, the determining, based on the trained machine learning model and the image data, target image data of the subject corresponding to the radiation source may include determining the target image data by inputting the image data into the trained machine learning model.

In some embodiments, the trained machine learning may be provided by a process including obtaining a plurality of training samples each of which includes image data of a sample subject including scatter data and a reference scatter distribution included in the image data of the sample subject; and training a preliminary machine learning model via performing multiple iterations, each iteration including updating parameter values of the preliminary machine learning model based on a difference between the reference scatter distribution and an estimated scatter distribution generated by the preliminary machine learning model based on the inputted image data.

In some embodiments, the obtaining a plurality of training samples may include, for one of the at least a portion of the plurality of radiation sources, obtaining the image data of the sample subject acquired by the imaging device when the beam stop array is not arranged on a path of radiation beams emitted by the radiation source. The obtaining a plurality of training samples may include, for one of the at least a portion of the plurality of radiation sources, obtaining first image data of the sample subject acquired by the imaging device when the beam stop array is arranged on a path of radiation beams emitted by the radiation source. The obtaining a plurality of training samples may include, for one of the at least a portion of the plurality of radiation sources, determining, based on the first image data, the reference scatter distribution associated with the sample subject included in the image data of the sample subject.

According to a third aspect of the present disclosure, a system for imaging via an imaging device including a plurality of radiation sources and a detector is provided. The system may include at least one storage device storing executable instructions, and at least one processor in communication with the at least one storage device. When executing the executable instructions, the at least one processor may cause the system to perform one or more of the following operations. For each of at least a portion of the plurality of radiation sources, the operations may include obtaining image data of a subject acquired by the imaging device via scanning the subject based on radiation beams emitted by the radiation source. For each of at least a portion of the plurality of radiation sources, the operations may include obtaining a calibration model corresponding to the radiation source. The calibration model may indicate a transform relationship between a position of each pixel in the image data and a position of a portion of the subject represented by the pixel in a space. For each of at least a portion of the plurality of radiation sources, the operations may further include determining, based on the image data of the subject, target image data of the subject using the calibration model.

In some embodiments, the determining, based on the image data of the subject, target image data of the subject using the calibration model may include performing a three-dimensional reconstruction operation on the image data corresponding to at least a portion of the plurality of radiation sources using multiple calibration models each of which corresponds to one of at least a portion of the plurality of radiation sources.

In some embodiments, the calibration model may be provided by a process. The process may include obtaining image data of a reference object acquired by the imaging device scanning the reference object. The reference object may include a support and multiple elements arranged on the support. Each of the multiple elements may include a material with an attenuation coefficient being different from an attenuation coefficient of a material of the support. The image data may include representations of at least six elements among the multiple elements. The process may include determining a first position of each of the at least six elements in the image data. The process may also include determining a second position of each of the at least six elements in a space where the imaging device is arranged. The process may further include determining, based on the first position and the second position, the calibration model.

In some embodiments, the determining, based on the first position and the second position, the calibration model may include determining, based on the first position and the second position, multiple pairs of positions each of which includes the first position and the second position of a same element among the at least six elements; and determining, based on the multiple pairs of positions, the calibration model.

In some embodiments, the first positions of six elements in the at least six elements may be different.

In some embodiments, one or more elements among the at least six elements may not be overlapped on transmission paths of the radiation beams emitted by the radiation source.

In some embodiments, an interval between two adjacent elements in the at least six elements may be determined based on at least one of a first distance between the radiation source or the reference object and a second distance between the radiation source and the detector of the imaging device.

According to a fourth aspect of the present disclosure, a system for geometric calibration for an imaging device including a plurality of radiation sources and a detector is provided. The system may include at least one storage device storing executable instructions, and at least one processor in communication with the at least one storage device. When executing the executable instructions, the at least one processor may cause the system to perform one or more of the following operations. For each of at least a portion of the plurality of radiation sources, the operations may include obtaining image data of a reference object acquired by the imaging device scanning the reference object. The reference object may include a support and multiple elements arranged on the support. Each of the multiple elements may include a material with an attenuation coefficient being different from an attenuation coefficient of a material of the support. The image data may include representations of at least six elements among the multiple elements. For each of at least a portion of the plurality of radiation sources, the operations may include determining a first position of each of the at least six elements in the image data. For each of at least a portion of the plurality of radiation sources, the operations may also include determining a second position of each of the at least six elements in a space where the imaging device is arranged. For each of at least a portion of the plurality of radiation sources, the operations may further include determining, based on the first position and the second position, a calibration model.

In some embodiments, the determining, based on the first position and the second position, a calibration model may include determining, based on the first position and the second position, multiple pairs of positions each of which includes the first position and the second position of a same element among the at least six elements; and determining, based on the multiple pairs of positions, the calibration model.

In some embodiments, the first positions of six elements in the at least six elements may be different.

In some embodiments, one or more elements among the at least six elements may not be overlapped on transmission paths of the radiation beams emitted by the radiation source.

In some embodiments, an interval between two adjacent elements in the at least six elements may be determined based on at least one of a first distance between the radiation source or the reference object and a second distance between the radiation source and the detector of the imaging device.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not scaled. These embodiments are non-limiting exemplary embodiments, in which like reference numerals represent similar structures throughout the several views of the drawings, and wherein:

FIG. 8 is a schematic flowchart illustrating an exemplary process for imaging according to some embodiments of the present disclosure;

FIG. 18 is a schematic diagram illustrating an exemplary process for determining target image data of a subject according to some embodiments of the present disclosure;

DETAILED DESCRIPTION

Figure 1:
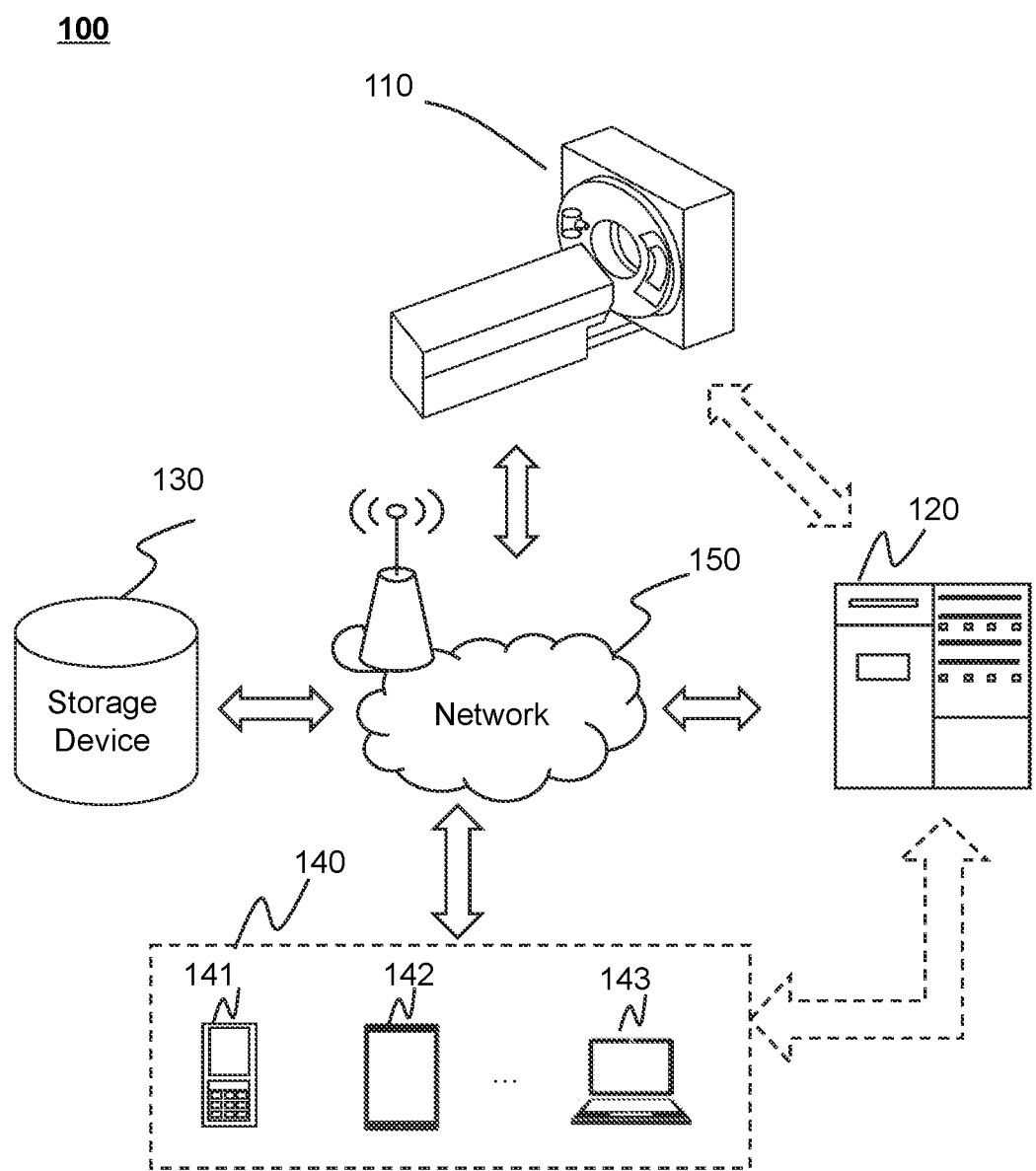
FIG. 1 is a schematic diagram illustrating an exemplary imaging system according to some embodiments of the present disclosure.

The following description is presented to enable any person skilled in the art to make and use the present disclosure and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including" when used in this disclosure, specify the presence of stated features, integers, steps, operations, elements, and/or components, but do not preclude the presence or addition of one or more other features, integers, steps, operations, elements, components, and/or groups thereof.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage devices. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an erasable programmable read-only memory (EPROM). It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that the term "system," "engine," "unit," "module," and/or "block" used herein are one method to distinguish different components, elements, parts, sections, or assembly of different levels in ascending order. However, the terms may be displaced by another expression if they achieve the same purpose.

It will be understood that when a unit, engine, module, or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments in the present disclosure. It is to be expressly understood, the operations of the flowchart may be implemented not in order. Conversely, the operations may be implemented in an inverted order, or simultaneously. Moreover, one or more other operations may be added to the flowcharts. One or more operations may be removed from the flowcharts.

Provided herein are systems and methods for imaging via an imaging device including a plurality of radiation sources. An aspect of the present disclosure relates to systems and methods for imaging using a beam stop array. Each of at least a portion of the plurality of radiation sources may be configured with a beam stop array that is configured to block at least a portion of radiation beams emitted by the radiation source. For one of the at least a portion of the plurality of radiation sources, the systems and methods may obtain first image data of a subject acquired by the imaging device when the beam stop array is arranged on a path of radiation beams emitted by the radiation source. The systems and methods may obtain second image data of the subject acquired by the imaging device when the beam stop array is not arranged on the path of radiation beams emitted by the radiation source. The systems and methods may also determine, based on the first image data, a scatter distribution associated with the subject included in the second image data. Further, the systems and methods may determine, based on the scatter distribution and the second image data, third image data of the subject corresponding to each of the at least a portion of the plurality of radiation sources. By using the beam stop array, the scatter distribution associated with the subject may be effectively and accurately determined and a scatter correction may be performed based on the scatter distribution, which improves the accuracy and quality of imaging. In some embodiments, the scatter distribution associated with the subject may be determined based on a trained machine learning model, which may improve efficiency and accuracy of scatter distribution determination, thereby improving the efficiency and accuracy of imaging correction.

Another aspect of the present disclosure relates to systems and methods for imaging using a reference object. For each of at least a portion of the plurality of radiation sources, the systems and methods may obtain image data of a subject acquired by the imaging device via scanning the subject based on radiation beams emitted by the radiation source. The systems and methods may obtain a calibration model corresponding to the radiation source, the calibration model indicating a transform relationship between a position of each pixel in the image data and a position of a portion of the subject represented by the pixel in a space. The systems and methods may determine target image data of the subject using the calibration model based on the image data of the subject. By using the calibration model of each radiation source, the change of one or more geometric parameters of the imaging device caused by mechanical accuracy errors during the service of the imaging device may be calibrated or offset, thereby improving the quality of imaging.

FIG. 1 is a schematic diagram illustrating an exemplary imaging system according to some embodiments of the present disclosure. In some embodiments, the imaging system 100 may be applied to any application scenario in which radiation rays (e.g., X-rays) are used for generating images and/or providing treatment, such as a computed tomography (CT) system, a digital radiography (DR) system, a C-arm X-ray system, a computed tomography-positron emission tomography (CT-PET) system, an image-guide radiotherapy (IGRT) system (e.g., a CT guided radiotherapy system), or the like, or a combination thereof. In some embodiments, the imaging system 100 may include modules and/or components for performing imaging and/or related analysis.

Merely by way of example, as illustrated in FIG. 1, the imaging system 100 may include a medical device 110, a processing device 120, a storage device 130, one or more terminals 140, and a network 150. The components in the imaging system 100 may be connected in one or more of various ways. Merely by way of example, the medical device 110 may be connected to the processing device 120 through the network 150. As another example, the medical device 110 may be connected to the processing device 120 directly as illustrated in FIG. 1. As a further example, the terminal(s) 140 may be connected to another component of the imaging system 100 (e.g., the processing device 120) via the network 150. As still a further example, the terminal(s) 140 may be connected to the processing device 120 directly as illustrated by the dotted arrow in FIG. 1. As still a further example, the storage device 130 may be connected to another component of the imaging system 100 (e.g., the processing device 120) directly as illustrated in FIG. 1, or through the network 150. In some embodiments, one or more components in the imaging system 100 may be omitted. Merely by way of example, the imaging system 100 may not include the terminal(s) 140.

The medical device 110 may be configured to acquire imaging data relating to at least one part of a subject. The imaging data relating to at least one part of a subject may include an image (e.g., an image slice), projection data, or a combination thereof. In some embodiments, the imaging data may be two-dimensional (2D) imaging data, three-dimensional (3D) imaging data, four-dimensional (4D) imaging data, or the like, or any combination thereof. The subject may be biological or non-biological. For example, the subject may include a patient, a man-made subject, etc. As another example, the subject may include a specific portion, organ, and/or tissue of the patient. For example, the subject may include the head, the neck, the thorax, the heart, the stomach, a blood vessel, soft tissue, a tumor, nodules, or the like, or any combination thereof.

In some embodiments, the medical device 110 may be a non-invasive biomedical medical device for disease diagnostic or research purposes. It should be noted that the scanner described above is merely provided for illustration purposes, and not intended to limit the scope of the present disclosure. For illustration purposes, the present disclosure mainly describes systems and methods relating to an X-ray imaging system. It should be noted that the X-ray imaging system described below is merely provided as an example, and not intended to limit the scope of the present disclosure. The systems and methods disclosed herein may be applied to any other imaging systems.

In some embodiments, the medical device 110 may be or include an X-ray imaging device, for example, a computed tomography (CT) scanner, a digital radiography (DR) scanner (e.g., a mobile digital radiography), a digital creast tomosynthesis (DBT) scanner, a digital subtraction angiography (DSA) scanner, a dynamic spatial reconstruction (DSR) scanner, an X-ray microscopy scanner, a multimodality scanner, etc. For example, the X-ray imaging device may include a support, one or more X-ray sources, and a detector. The support may be configured to support the X-ray sources and/or the detector. The X-ray sources may be configured to emit X-rays toward the target subject to be scanned. The detector may be configured to detect X-rays passing through the target subject. In some embodiments, the X-ray imaging device may be, for example, a C-shape X-ray imaging device, an upright X-ray imaging device, a suspended X-ray imaging device, or the like. In some embodiments, the medical device 110 may include multiple radiation sources (e.g., X-ray sources) that are arranged as an array. Each of the multiple radiation sources may correspond to a region of the detector. The radiation rays emitted by each of the multiple radiation sources may receive by detecting units in the region of the detector corresponding to the radiation source. More descriptions for the medical device 110 may be found in elsewhere in the present disclosure (e.g., FIG. 2 and the descriptions thereof).

The processing device 120 may process data and/or information obtained from the medical device 110, the terminal(s) 140, and/or the storage device 130. For example, the processing device 120 may obtain image data of a subject acquired by an imaging device (e.g., the medical device 110) via scanning the subject based on radiation beams emitted by the radiation source. The processing device 120 may also obtain a calibration model corresponding to the radiation source. The calibration model may indicate a transform relationship between a position of each pixel in the image data and a position of a portion of the subject represented by the pixel in a space. The processing device 120 may further determine target image data using the calibration model based on the image data. As another example, the processing device 120 may obtain first image data of a subject acquired by an imaging device (e.g., the medical device 110) when the beam stop array is arranged on a path of radiation beams emitted by the radiation source. The processing device 120 may also obtain second image data of the subject acquired by the imaging device when the beam stop array is not arranged on the path of radiation beams emitted by the radiation source. The processing device 120 may determine, based on the first image data, a scatter distribution associated with the subject included in the second image data. The processing device 120 may further determine, based on the scatter distribution and the second image data, third image data of the subject corresponding to each of the at least a portion of the plurality of radiation sources. As still another example, the processing device 120 may obtain image data of a subject acquired by an imaging device (e.g., the medical device 110) via scanning the subject based on radiation beams emitted by the radiation source. The image data may include scatter data caused by a scattering of at least a portion of the radiation beams passing through the subject. The processing device 120 may also obtain a trained machine learning model. The processing device 120 may further determine, based on the trained machine learning model and the image data, target image data of the subject corresponding to the radiation source. The target image data may include an image quality higher than an image quality of the image data caused by the scatter data included in the image data.

The trained machine learning model used in the present disclosure (e.g., the trained machine learning model) may be updated from time to time, e.g., periodically or not, based on a sample set that is at least partially different from the original sample set from which the original trained machine learning model is determined. For instance, the trained machine learning model may be updated based on a sample set including new samples that are not in the original sample set. In some embodiments, the determination and/or updating of the trained machine learning model may be performed on a processing device, while the application of the trained machine learning model may be performed on a different processing device. In some embodiments, the determination and/or updating of the trained machine learning model may be performed on a processing device of a system different than the imaging system 100 or a server different than a server including the processing device 120 on which the application of the trained machine learning model is performed. For instance, the determination and/or updating of the trained machine learning model may be performed on a first system of a vendor who provides and/or maintains such a machine learning model and/or has access to training samples used to determine and/or update the trained machine learning model, while imaging correction based on the provided machine learning model may be performed on a second system of a client of the vendor. In some embodiments, the determination and/or updating of the trained machine learning model may be performed online in response to a request for imaging correction. In some embodiments, the determination and/or updating of the trained machine learning model may be performed offline.

In some embodiments, the processing device 120 may be a computer, a user console, a single server, or a server group, etc. The server group may be centralized or distributed. In some embodiments, the processing device 120 may be local or remote. For example, the processing device 120 may access information and/or data stored in the medical device 110, the terminal(s) 140, and/or the storage device 130 via the network 150. As another example, the processing device 120 may be directly connected to the medical device 110, the terminal(s) 140, and/or the storage device 130 to access stored information and/or data. In some embodiments, the processing device 120 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

The storage device 130 may store data, instructions, and/or any other information. In some embodiments, the storage device 130 may store data obtained from the terminal(s) 140 and/or the processing device 120. The data may include image data acquired by the processing device 120, algorithms and/or models for processing the image data, etc. For example, the storage device 130 may store image data (e.g., X-ray images, X-ray projection data, etc.) acquired by the medical device 110. As another example, the storage device 130 may store one or more algorithms for processing the image data, a trained machine learning model for imaging correction, etc. In some embodiments, the storage device 130 may store data and/or instructions that the processing device 120 may execute or use to perform exemplary methods/systems described in the present disclosure. In some embodiments, the storage device 130 may include a mass storage, removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memories may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 130 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 130 may be connected to the network 150 to communicate with one or more other components in the imaging system 100 (e.g., the processing device 120, the terminal(s) 140, etc.). One or more components in the imaging system 100 may access the data or instructions stored in the storage device 130 via the network 150. In some embodiments, the storage device 130 may be directly connected to or communicate with one or more other components in the imaging system 100 (e.g., the processing device 120, the terminal(s) 140, etc.). In some embodiments, the storage device 130 may be part of the processing device 120.

The terminal(s) 140 may include a mobile device 141, a tablet computer 140-2, a laptop computer 143, or the like, or any combination thereof. In some embodiments, the mobile device 141 may include a smart home device, a wearable device, a mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, a footgear, eyeglasses, a helmet, a watch, clothing, a backpack, a smart accessory, or the like, or any combination thereof. In some embodiments, the mobile device may include a mobile phone, a personal digital assistant (PDA), a gaming device, a navigation device, a point of sale (POS) device, a laptop, a tablet computer, a desktop, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include a Google Glass™, an Oculus Rift™, a Hololens™, a Gear VR™, etc. In some embodiments, the terminal(s) 140 may be part of the processing device 120.

The network 150 may include any suitable network that can facilitate the exchange of information and/or data for the imaging system 100. In some embodiments, one or more components of the medical device 110 (e.g., an MRI device, a PET device, etc.), the terminal(s) 140, the processing device 120, the storage device 130, etc., may communicate information and/or data with one or more other components of the imaging system 100 via the network 150. For example, the processing device 120 may obtain data from the medical device 110 via the network 150. As another example, the processing device 120 may obtain user instructions from the terminal(s) 140 via the network 150. The network 150 may be and/or include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network, etc.), a cellular network (e.g., a Long Term Evolution (LTE) network), a frame relay network, a virtual private network ("VPN"), a satellite network, a telephone network, routers, hubs, switches, server computers, and/or any combination thereof. Merely by way of example, the network 150 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 150 may include one or more network access points. For example, the network 150 may include wired and/or wireless network access points such as base stations and/or internet exchange points through which one or more components of the imaging system 100 may be connected to the network 150 to exchange data and/or information.

It should be noted that the above description of the imaging system 100 is merely provided for the purposes of illustration, and not intended to limit the scope of the present disclosure. For persons having ordinary skills in the art, multiple variations and modifications may be made under the teachings of the present disclosure. For example, the assembly and/or function of the imaging system 100 may be varied or changed according to specific implementation scenarios.

Figure 2:
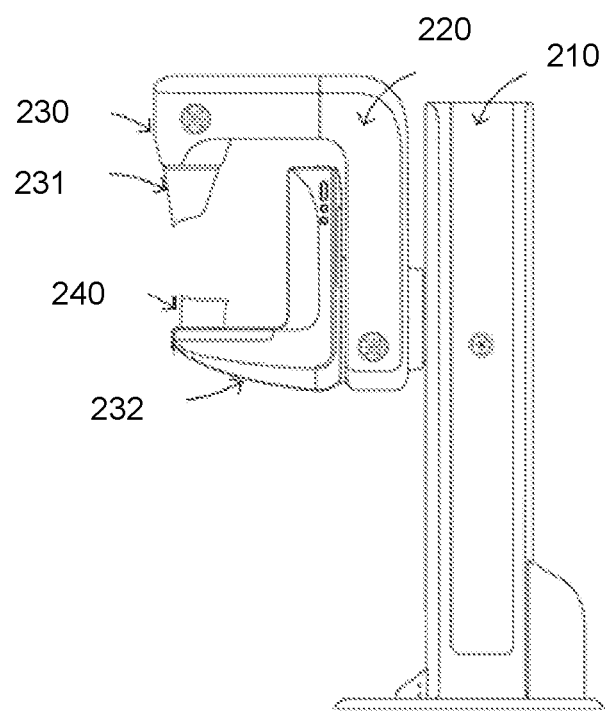
FIG. 2 is a schematic diagram illustrating an exemplary medical device according to some embodiments of the present disclosure.

FIG. 2 is a schematic diagram illustrating an exemplary medical device 200 according to some embodiments of the present disclosure. The medical device 200 may be an exemplary embodiment of the medical device 110 as described in connection with FIG. 1. In some embodiments, the medical device 200 may be an X-ray imaging device. The medical device 200 may include a gantry 210, a supporting component 220, and an imaging component 230.

The gantry 210 may be configured to provide a support for the supporting component 220 and the imaging component 230.

The supporting component 220 may be configured to provide a support for the imaging component 230. In some embodiments, the supporting component 220 may be moveably connected with the gantry 210. In some embodiments, the supporting component 220 may include a driving component. The driving component may be configured to drive the supporting component 220 to move by, e.g., translating and/or rotating. For example, the supporting component 220 may be driven to move a certain height in a vertical direction along the gantry 210 by the driving component according to a target height of a subject. As another example, the supporting component 220 may be driven to rotate around a connection between the supporting component 220 and the gantry 210 to form a certain angle according to a target angle of a subject. The imaging component 230 may be installed on the supporting component 220. The imaging component 230 may move along with the movement of the supporting component 220. For example, when the supporting component 220 moves in the vertical direction along the gantry 210, the imaging component 230 may move in the vertical direction along with the movement of the supporting component 220. When the supporting component 220 rotates to a certain angle, the imaging component 230 may rotate to the certain angle along with the rotation of the supporting component 220.

The imaging component 230 may include a radiation beam generation component 231 and a detector 232. The radiation beam generation component 231 may generate and emit radiation beams to the subject. The radiation beams may include a particle ray, a photon ray, or the like, or a combination thereof. In some embodiments, the radiation beams may include a plurality of radiation particles (e.g., neutrons, protons, electrons, μ-mesons, heavy ions), a plurality of radiation photons (e.g., X-rays, γ-rays, ultraviolet, laser), or the like, or a combination thereof. In some embodiments, the radiation beam generation component 231 may include a plurality of light sources (also referred to as radiation sources) arranged as an array. In some embodiments, the plurality of radiation sources may be arranged in a planar plane. In some embodiments, the plurality of radiation sources may be arranged in a curved plane. In some embodiments, the plurality of radiation sources may be arranged in different planar planes. More descriptions regarding the radiation beam generation component 231 may be found in elsewhere in the present disclosure (e.g., FIGS. 3 and 4 and the descriptions thereof).

The detector 232 may detect radiation beams emitted from the radiation beam generation component 231. In some embodiments, the detector 232 may include a plurality of detecting units. Each of the detecting units may include a crystal element (e.g., a scintillator crystal) and a photosensor. A crystal element (e.g., a scintillator crystal) may scintillate when a radiation ray (e.g., γ ray) photon impinges on the crystal element. The crystal element may absorb the energy of the radiation ray (e.g., X ray) photon, and convert the absorbed energy into light. The crystal element may use one or more types of crystals including, for example, NaI (Tl), BGO, LSO, YSO, GSO, LYSO, LaBr$_3$, LFS, LuAP, LuI$_3$, BaF$_2$, CeF, CsI(Tl), CsI(Na), CaF$_2$(Eu), CdWO$_4$, YAP, or the like, or any combination thereof. A photosensor may convert a light signal (e.g., the light output from a scintillator) to an electrical signal. The electrical signal may be processed by an electronic circuit to form the projection data. In some embodiments, a photosensor may be a photomultiplier tube (PMT), a silicon photomultiplier (SiPM), etc.

The detector 232 may include a scintillation detector (e.g., a cesium iodide detector) or a gas detector. The detector 232 may be a single-row detector or a multi-rows detector. In some embodiments, the detector 232 may include a flat panel detector. In some embodiments, the detector 232 may be movably connected with the supporting component 220. The detector 232 may move relative to the supporting component 220. In some embodiments, the radiation beam generation component 231 and the detector 232 may be respectively disposed at two ends of the supporting component 220. A detection region may be formed between the radiation beam generation component 231 and the detector 232. A subject 240 (e.g., a reference object as described elsewhere in the present disclosure) may be located at the detection region for the acquisition of image data of the subject. In some embodiments, a reference object may be arranged in the detection region to obtain a calibration model corresponding to the radiation source. The reference object may include a phantom. In some embodiments, the reference object may include a support (also referred to as a first support) and multiple elements (also referred to as first elements) arranged on the support. Each of the multiple elements may include a material with an attenuation coefficient that is different from an attenuation coefficient of a material of the support. Each of the plurality of radiation sources in the radiation beam generation component 231 may correspond to a portion of the multiple elements. As used herein, a radiation source corresponding to a portion of the multiple elements may refer to that radiation beams emitted by the radiation source are able to pass through the portion of the multiple elements. The radiation source corresponding to a portion of the multiple elements may also be referred to the radiation source covering the portion of the multiple elements. More descriptions regarding the reference object may be found in elsewhere in the present disclosure (e.g., FIG. 12 and the descriptions thereof).

It should be noted that the examples illustrated in FIG. 2 are provided for the purposes of illustration, and not intended to limit the scope of the present disclosure. For persons having ordinary skills in the art, various modifications and changes in the forms and details of the application of the above method and system may occur without departing from the principles of the present disclosure. In some embodiments, the gantry 210 may be configured in any suitable manner, such as a C-shaped support, a U-shape support, a G-shape support, or the like. In some embodiments, the medical device 200 may include one or more additional components not described and/or without one or more components illustrated in FIG. 2. For example, the medical device 200 may further include a camera. In some embodiments, the support component 220 and the gantry 210 may be integrated into one single component.

Figure 3:
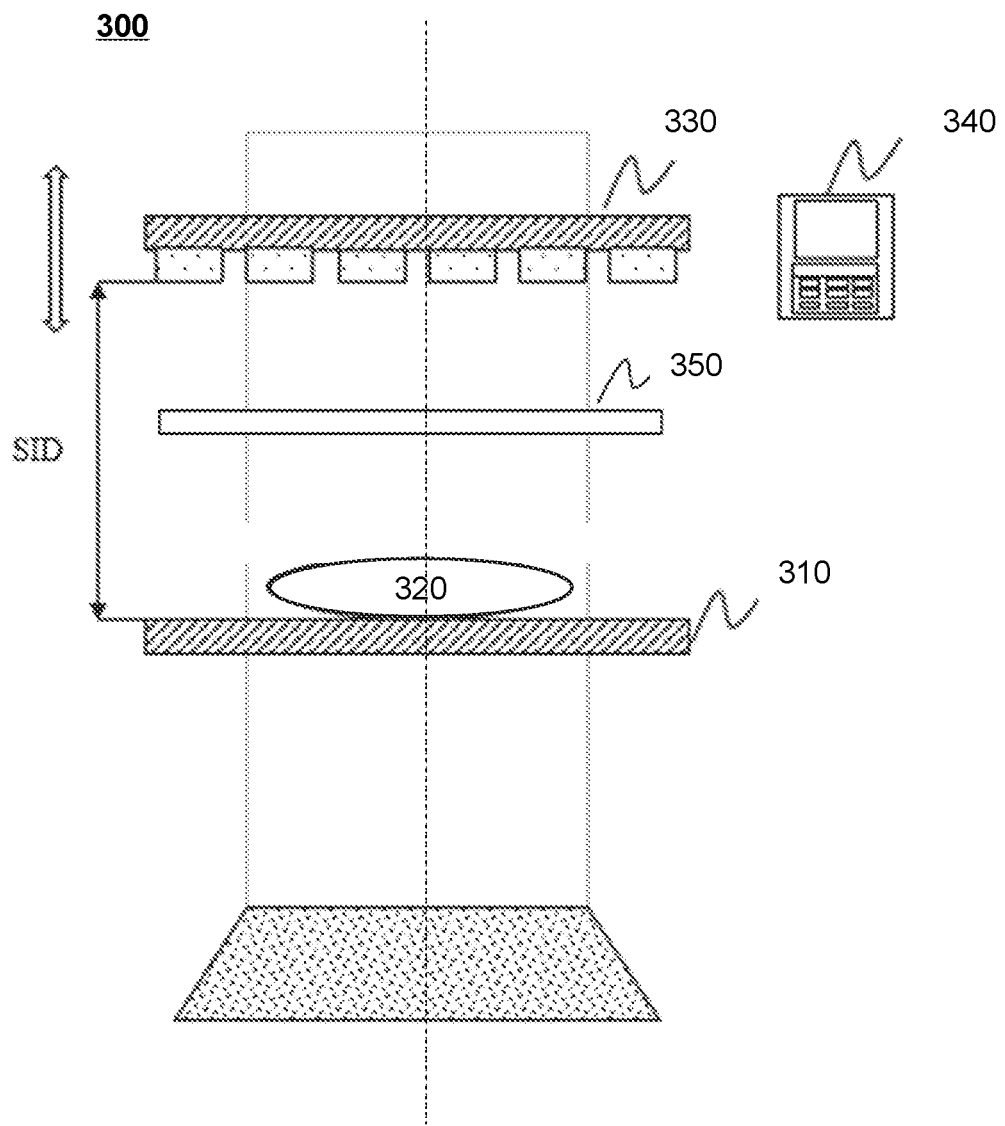
FIG. 3 is a schematic diagram illustrating an exemplary medical device according to some embodiments of the present disclosure.

FIG. 3 is a schematic diagram illustrating an exemplary medical device 300 according to some embodiments of the present disclosure. The medical device 300 may be an exemplary embodiment of the medical device 110 as described in connection with FIG. 1.

In some embodiments, the medical device 300 may include an X-ray imaging device including a plurality of radiation sources. The medical device 300 may include a detector 310, a radiation beam generation component 330, a control device 340, and a blocker 350.

The detector 310 may be configured to detect at least part of radiation beams (e.g., X-ray photons) emitted by the radiation beam generation component 330. In some embodiments, the detector 310 may be arranged opposite to the radiation beam generation component 330. In some embodiments, the detector 310 may include multiple detecting units arranged in a plane substantially perpendicular to the central axis of a radiation beam (e.g., X-rays) emitted by the radiation beam generation component 330 (shown as dotted line as shown in FIG. 3). The radiation beam (e.g., X-rays) emitted by the radiation beam generation component 330 may be received or detected by the detector 310. In some embodiments, the subject 320 may include a biological body or a non-biological body. Merely by way of example, the subject 320 may include a breast. More descriptions regarding the detector may be found in elsewhere in the present disclosure (e.g., FIG. 2 and the descriptions thereof).

In some embodiments, the radiation beam generation component 330 may include a plurality of radiation sources (also referred to as light sources) and at least one radiation source panel. A radiation source in the radiation beam generation component 330 may include a field emission cold cathode ray source. Each of one or more radiation sources in the radiation beam generation component 330 may emit the radiation beams (e.g., X-rays) to the subject 320. In some embodiments, at least two of the plurality of radiation sources may operate independently. In some embodiments, at least two of the plurality of radiation sources may operate synchronously.

In some embodiments, the plurality of radiation sources may be arranged at the radiation source panel in a predetermined arrangement. For example, the plurality of radiation sources may be arranged at a certain interval (e.g., a same interval, a proportional interval, etc.). As another example, the plurality of radiation sources may be arranged to form a certain shape (e.g., a circle, a square, a rhombus, a trapezium, an arc, etc.). In some embodiments, the radiation beam generation component 330 may include two or more radiation source panels arranged at a certain angle. In some embodiments, the angle between the radiation source panels may be adjusted. For example, the radiation source panels may be rotated relative to each other to adjust the angle between the radiation source panels. In some embodiments, the angle range between the radiation source panels may be in a range from 140 to 180 degrees. In some embodiments, the angle range between the radiation source panels may be in a range from 90 to 180 degrees. In some embodiments, the angle range between the radiation source panels may be in a range from 60 to 180 degrees. In some embodiments, the angle range between the radiation source panels may be in a range from 30 to 180 degrees. In some embodiments, the angle range between the radiation source panels may be in a range from 0 to 180 degrees.

In some embodiments, the radiation beam generation component 330 may be mounted on a gantry. For example, the radiation beam generation component 330 may be mounted on a supporting component that is movably connected with the gantry. The plurality of radiation sources distributed in different positions of the radiation source panels may achieve different radiation angles without moving the gantry. In some embodiments, at least one of the plurality of radiation sources may be physically connected with the radiation source panel in a non-detachable manner. In some embodiments, at least one of the plurality of radiation sources may be detachably connected to the radiation source panel to facilitate maintenance and replacement of each radiation source.

The control device 340 may include a processing device for controlling components of the medical device 300 to perform an imaging operation. In some embodiments, the control device 340 may control radiation parameters of each radiation source in the radiation beam generation component 330 to obtain the image data of the subject 320 under the radiation parameters. In some embodiments, the radiation parameter of a radiation source in the radiation beam generation component 330 may include a position of the radiation source in the radiation beam generation component 330, a corresponding radiation dose, etc. In some embodiments, the control device 340 may obtain a control instruction input manually. The control instruction may be configured to instruct the control device 340 to control the radiation parameter of each radiation source in the radiation beam generation component 330. For example, the control device 340 may obtain a control instruction manually input by a user through a terminal (e.g., the terminal 140). In some embodiments, the control device 340 may automatically control the radiation parameter of each radiation source in the radiation beam generation component 330. For example, the control device 340 may automatically adjust the radiation parameter of each radiation source in the radiation beam generation component 330 according to information of the subject. In some embodiments, the information of the subject may include a height, a weight, an age, historical inspection data, health index, etc., or any combination thereof, of the subject. In some embodiments, the control device 340 may select corresponding control parameters according to a predetermined protocol. For example, a certain scanning protocol, a turn-on sequence, a scanning duration, etc., may correspond to a specific radiation dose of the radiation source.

In some embodiments, the blocker 350 may be provided between the radiation beam generation component 330 and the detector 310 in an imaging process. For example, the blocker 350 may be located between the radiation beam generation component 330 and the subject 320 in the acquisition of image data of the subject 320. The blocker 350 may include one or more beam stop arrays. Each of the one or more beam stop arrays may correspond to one of the plurality of radiation sources in the radiation beam generation component 330. Each of the one or more beam stop arrays may include a support (also referred to as a second support) (e.g., the support 410) and multiple elements (also referred to as second elements) (e.g., the element 420). In some embodiments, each of the multiple elements may include a material with an attenuation coefficient exceeding an attenuation coefficient of a material of the support. For example, the support may be composed of low-attenuation materials, such as, plastic, rubber, aluminum, plexiglass, or the like. The element may be composed of high-attenuation materials, such as, lead, concrete, or the like. The element may be configured to block radiation beams emitted by a radiation source in the radiation beam generation component 330. In some embodiments, the support may have a regular structure, such as, a rectangular parallelepiped, a cylinder, a bevel, or the like. In some embodiments, the support may include a plate including an irregular structure, such as, a "V"-shaped structure, a wave-shaped structure, a folded plate structure, or the like. In some embodiments, the element may be arranged in the support at a same interval. In some embodiments, the multiple elements in the beam stop array may be arranged in the support at different intervals.

Figure 4:
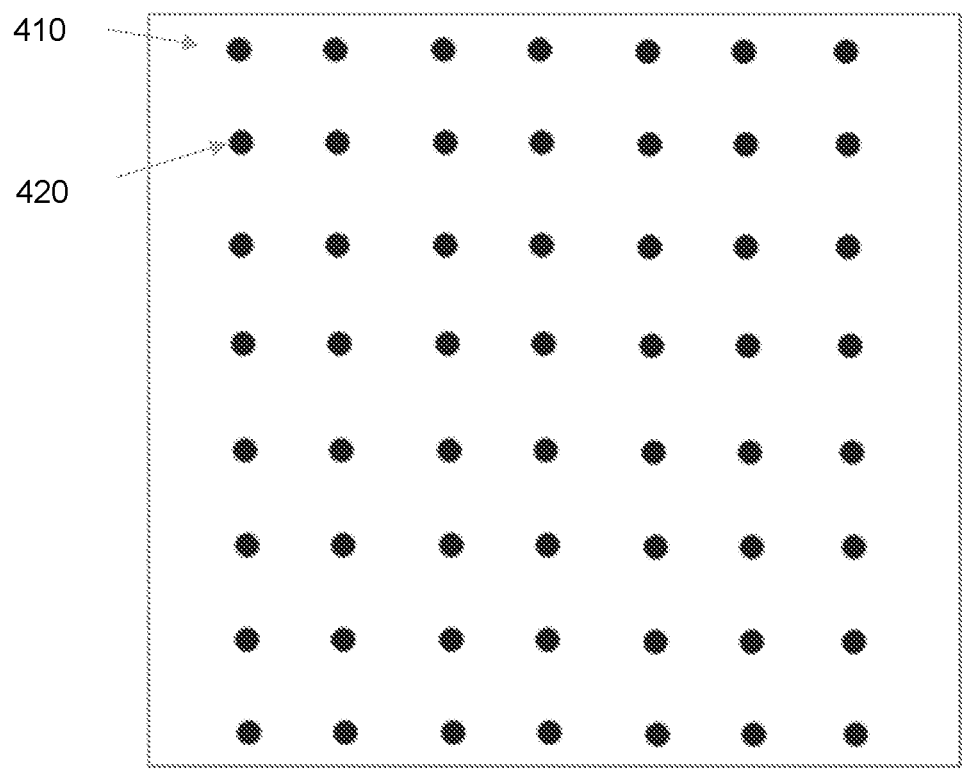
FIG. 4 is a schematic diagram illustrating an exemplary beam stop array according to some embodiments of the present disclosure.

Referring to FIG. 4, FIG. 4 is a schematic diagram illustrating an exemplary beam stop array according to some embodiments of the present disclosure. As shown in FIG. 4, multiple elements 420 of the beam stop array may be arranged on a support 410 in a form of a rectangular array, for example, a 7×8 rectangular array. The white part may be the support 410, and the black part may be the elements 420.

In some embodiments, a count (or number) of beam stop arrays in the blocker 350 may be the same as a count of radiation sources in the radiation beam generation component 330. Each beam stop array may correspond to one radiation source in the radiation beam generation component 330. For example, if the radiation beam generation component 330 includes 10 radiation sources, the blocker 350 may include 10 beam stop arrays. In some embodiments, the count of beam stop arrays in the blocker 350 may be less than the count of radiation sources in the radiation beam generation component 330. One of the beam stop arrays in the blocker may correspond to one single radiation source in the radiation beam generation component 330. Alternatively, one radiation source in the radiation beam generation component 330 may not have a corresponding beam stop array in the blocker 350. For example, c may include 10 radiation sources, and the count of the beam stop array 350 may be 1, or 2, or 3, . . . , or 9 (any count less than 10), etc. When the count of beam stop arrays in the blocker 350 is less than the count of radiation sources in the radiation beam generation component 330, each of one or more radiation sources in the radiation beam generation component 330 may be not configured with a beam stop array.

The one or more beam stop arrays in the blocker 350 may be independent. In some embodiments, the one or more beam stop arrays in the blocker 350 may be detachably connected with the medical device 300. When a beam stop array of the blocker 350 is needed to be arranged on a path of a radiation beam emitted by a radiation source in the radiation beam generation component 330, the beam stop array of the blocker 350 may be mounted on the medical device 300 between the radiation beam generation component 330 and the subject 220; when the beam stop array of the blocker 350 is not needed to be arranged on the path of the radiation beam emitted by the radiation source in the radiation beam generation component 330, the beam stop array of the blocker 350 may be removed from the medical device 300.

In some embodiments, the one or more beam stop arrays in the blocker 350 may be movably. For example, a beam stop array in the blocker 350 may move to a position between the radiation beam generation component 330 and the subject 320. For example, the beam stop array in the blocker 350 may be moved to and arranged on a path of radiation beams emitted by the radiation beam generation component 330 using a transmission device. As another example, the beam stop array in the blocker 350 may move away from a position between the radiation beam generation component 330 and the subject 320. For example, the beam stop array in the blocker 350 may be moved away from and not arranged on the path of radiation beams emitted by the radiation beam generation component 330 using the transmission device. In some embodiments, a beam stop array in the blocker 350 may be controlled automatically or manually by the control device 340 to block part or all paths of the radiation sources in the radiation beam generation component 330 or to remove from some or all paths of the radiation sources in the radiation beam generation component 330 by sliding, rotating, etc.

In some embodiments, the detector 310 may be fixedly arranged relative to the gantry, and the radiation beam generation component 330 and the blocker 350 may be movably arranged relative to the gantry. As shown in FIG. 3, the radiation beam generation component 330 and the blocker 350 may be arranged on a moving rail of the gantry. Therefore, the radiation beam generation component 330 and the blocker 350 may be driven to move up and down along the moving rail of the gantry to adjust a distance between the radiation beam generation component 330 and the subject 320 and a distance between the blocker 350 and the subject 320. Correspondingly, a distance between the radiation source 330 and the detector 310 (i.e., a source to image receptor distance (SID)) may be adjusted by controlling the radiation beam generation component 330 to move along the moving rail of the gantry. Alternatively, a distance between the blocker 350 and the detector 310 may be adjusted by controlling the blocker 350 to move along the gantry. In some embodiments, the detector 310 and the blocker 350 may be movably arranged relative to the gantry, and the radiation beam generation component 330 may be fixedly arranged relative to the gantry. For example, the detector 310 and the blocker 350 may be arranged on the moving rail of the gantry. Therefore, the detector 310 and the beam stop array 350 may be driven to move up and down along the moving rail of the gantry. The SID may be adjusted by controlling the detector 310 to move along the moving rail of the gantry. The distance between the blocker 350 and the detector 310 may also be adjusted by controlling the blocker 350 to move along the moving rail of the gantry. In some embodiments, the SID and the distance between the beam stop array 350 and the detector may be adjusted automatically or manually by the control device 340.

It should be noted that the examples illustrated in FIG. 3 are provided for the purposes of illustration, and not intended to limit the scope of the present disclosure. For persons having ordinary skills in the art, various modifications and changes in the forms and details of the application of the above method and system may occur without departing from the principles of the present disclosure. In some embodiments, the medical device 300 may further include one or more components. For example, the medical device 300 may further include a stage for fixing the subject 320. The detector 310 may be integrated with the stage or separated from the stage.

Figure 5:
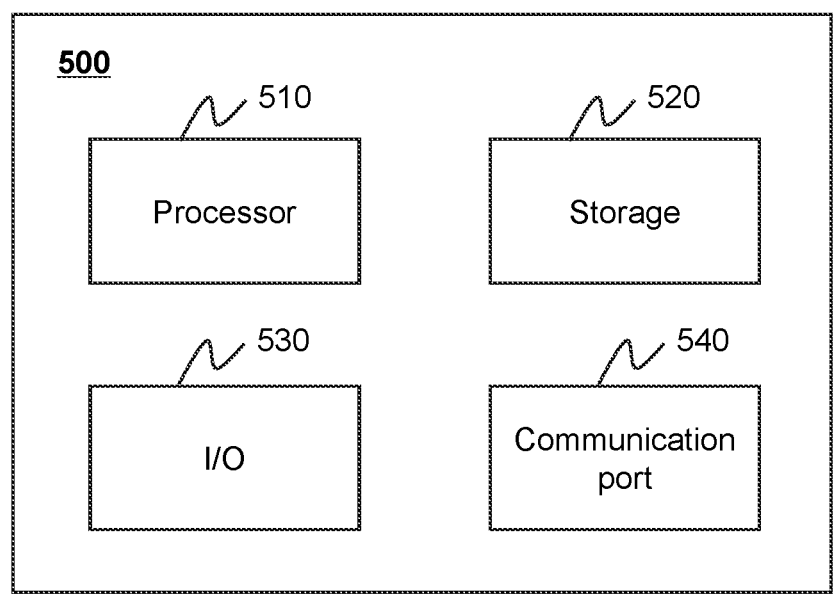
FIG. 5 is a schematic diagram illustrating hardware and/or software components of an exemplary computing device on which the processing device may be implemented according to some embodiments of the present disclosure.

FIG. 5 is a schematic diagram illustrating hardware and/or software components of an exemplary computing device 500 on which the processing device 120 may be implemented according to some embodiments of the present disclosure. As illustrated in FIG. 5, the computing device 500 may include a processor 510, a storage 520, an input/output (I/O) 530, and a communication port 540.

The processor 510 may execute computer instructions (program codes) and perform functions of the processing device 120 in accordance with techniques described herein. The computer instructions may include, for example, routines, programs, objects, components, signals, data structures, procedures, modules, and functions, which perform particular functions described herein. For example, the processor 510 may process data obtained from the medical device 110, the terminal(s) 140, the storage device 130, and/or any other component of the imaging system 100. Specifically, the processor 510 may process image data obtained from the medical device 110. For example, the processor 510 may determine target image data using a calibration model based on image data. As another example, the processing device 120 may determine, based on first image data, a scatter distribution associated with the subject included in second image data. In some embodiments, the target image data may be stored in the storage device 130, the storage 520, etc. In some embodiments, the target image data may be displayed on a display device by the I/O 530. In some embodiments, the processor 510 may perform instructions obtained from the terminal(s) 140. In some embodiments, the processor 510 may include one or more hardware processors, such as a microcontroller, a microprocessor, a reduced instruction set computer (RISC), an application-specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field-programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 500. However, it should be noted that the computing device 500 in the present disclosure may also include multiple processors. Thus operations and/or method steps that are performed by one processor as described in the present disclosure may also be jointly or separately performed by the multiple processors. For example, if in the present disclosure the processor of the computing device 500 executes both operation A and operation B, it should be understood that operation A and operation B may also be performed by two or more different processors jointly or separately in the computing device 500 (e.g., a first processor executes operation A and a second processor executes operation B, or the first and second processors jointly execute operations A and B).

The storage 520 may store data/information obtained from the medical device 110, the terminal(s) 140, the storage device 130, or any other component of the imaging system 100. In some embodiments, the storage 520 may include a mass storage device, a removable storage device, a volatile read-and-write memory, a read-only memory (ROM), or the like, or any combination thereof. For example, the mass storage may include a magnetic disk, an optical disk, a solid-state drive, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage 520 may store one or more programs and/or instructions to perform exemplary methods described in the present disclosure. For example, the storage 520 may store a program for the processing device 120 for generating attenuation correction data for a PET image.

The I/O 530 may input or output signals, data, and/or information. In some embodiments, the I/O 530 may enable user interaction with the processing device 120. In some embodiments, the I/O 530 may include an input device and an output device. Exemplary input devices may include a keyboard, a mouse, a touch screen, a microphone, or the like, or a combination thereof. Exemplary output devices may include a display device, a loudspeaker, a printer, a projector, or the like, or a combination thereof. Exemplary display devices may include a liquid crystal display (LCD), a light-emitting diode (LED)-based display, a flat panel display, a curved screen, a television device, a cathode ray tube (CRT), or the like, or a combination thereof.

The communication port 540 may be connected with a network (e.g., the network 150) to facilitate data communications. The communication port 540 may establish connections between the processing device 120 and the medical device 110, the terminal(s) 140, or the storage device 130. The connection may be a wired connection, a wireless connection, or a combination of both that enables data transmission and reception. The wired connection may include an electrical cable, an optical cable, a telephone wire, or the like, or any combination thereof. The wireless connection may include a Bluetooth network, a Wi-Fi network, a WiMax network, a WLAN, a ZigBee network, a mobile network (e.g., 3G, 4G, 5G, etc.), or the like, or any combination thereof. In some embodiments, the communication port 540 may be a standardized communication port, such as RS232, RS485, etc. In some embodiments, the communication port 540 may be a specially designed communication port. For example, the communication port 540 may be designed in accordance with the digital imaging and communications in medicine (DICOM) protocol.

Figure 6:
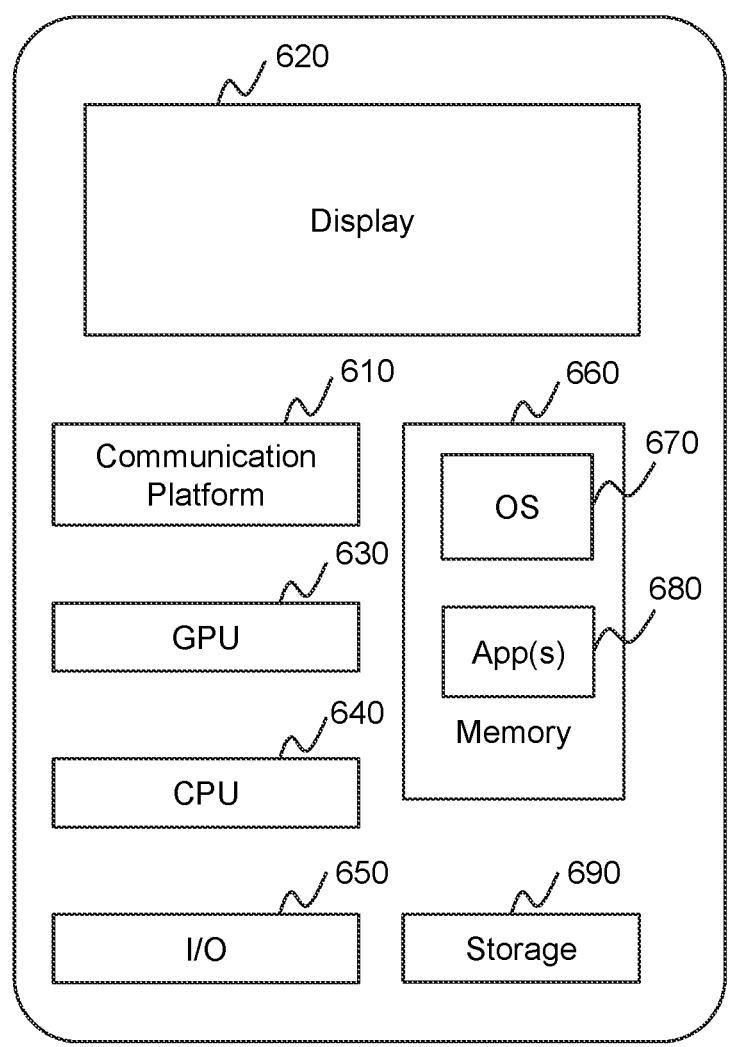
FIG. 6 is a schematic diagram illustrating hardware and/or software components of an exemplary mobile device according to some embodiments of the present disclosure.

FIG. 6 is a schematic diagram illustrating hardware and/or software components of an exemplary mobile device 600 according to some embodiments of the present disclosure. As illustrated in FIG. 6, the mobile device 600 may include a communication platform 610, a display 620, a graphics processing unit (GPU) 630, a central processing unit (CPU) 640, an I/O 650, a memory 660, and a storage 690. In some embodiments, any other suitable component, including but not limited to a system bus or a controller (not shown), may also be included in the mobile device 600. In some embodiments, a mobile operating system 670 (e.g., iOS, Android, Windows Phone, etc.) and one or more applications 680 may be loaded into the memory 660 from the storage 690 in order to be executed by the CPU 640. The applications 680 may include a browser or any other suitable mobile apps for receiving and rendering information relating to image processing or other information from the processing device 120. User interactions with the information stream may be achieved via the I/O 650 and provided to the processing device 120 and/or other components of the imaging system 100 via the network 150.

To implement various modules, units, and functionalities described in the present disclosure, computer hardware platforms may be used as the hardware platform(s) for one or more of the elements described herein. The hardware elements, operating systems, and programming languages of such computers are conventional in nature, and it is presumed that those skilled in the art are adequately familiar therewith to adapt those technologies to generate an image as described herein. A computer with user interface elements may be used to implement a personal computer (PC) or another type of work station or terminal device, although a computer may also act as a server if appropriately programmed. It is believed that those skilled in the art are familiar with the structure, programming, and general operation of such computer equipment and as a result, the drawings should be self-explanatory.

Figure 7:
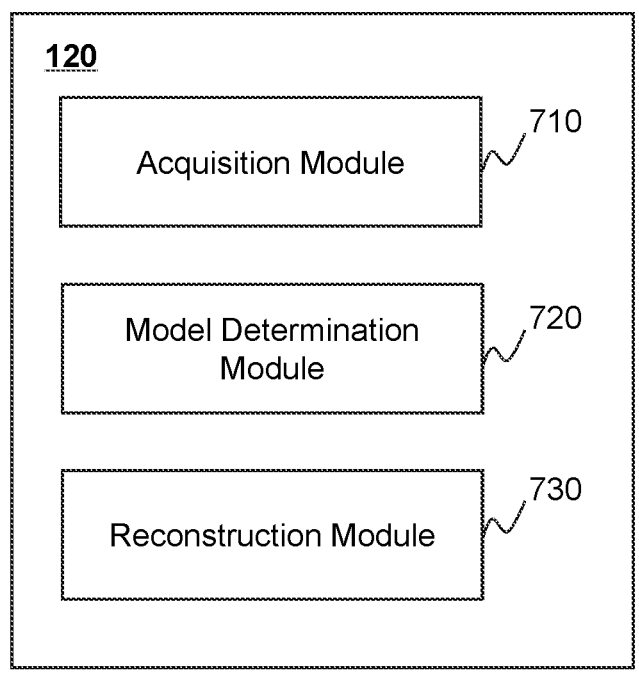
FIG. 7 is a block diagram illustrating an exemplary processing device according to some embodiments of the present disclosure.

FIG. 7 is a block diagram illustrating an exemplary processing device according to some embodiments of the present disclosure. In some embodiments, processing device 120 may be implemented on a computing device 500 (e.g., the processor 510) illustrated in FIG. 5 or a CPU 640 as illustrated in FIG. 6. As illustrated in FIG. 7, the processing device 120 may include an acquisition module 710, a model determination module 720, and a reconstruction module 730. Each of the modules described above may be a hardware circuit that is designed to perform certain actions, e.g., according to a set of instructions stored in one or more storage media, and/or any combination of the hardware circuit and the one or more storage media.

The acquisition module 710 may be configured to data related to geometric calibration. In some embodiments, the acquisition module 710 may be configured to obtain image data of a subject acquired by an imaging device via scanning the subject based on radiation beams emitted by each of at least a portion of a plurality of radiation sources. In some embodiments, the acquisition module 710 may be configured to obtain a calibration model corresponding to each of at least a portion of a plurality of radiation sources.

Figure 10:
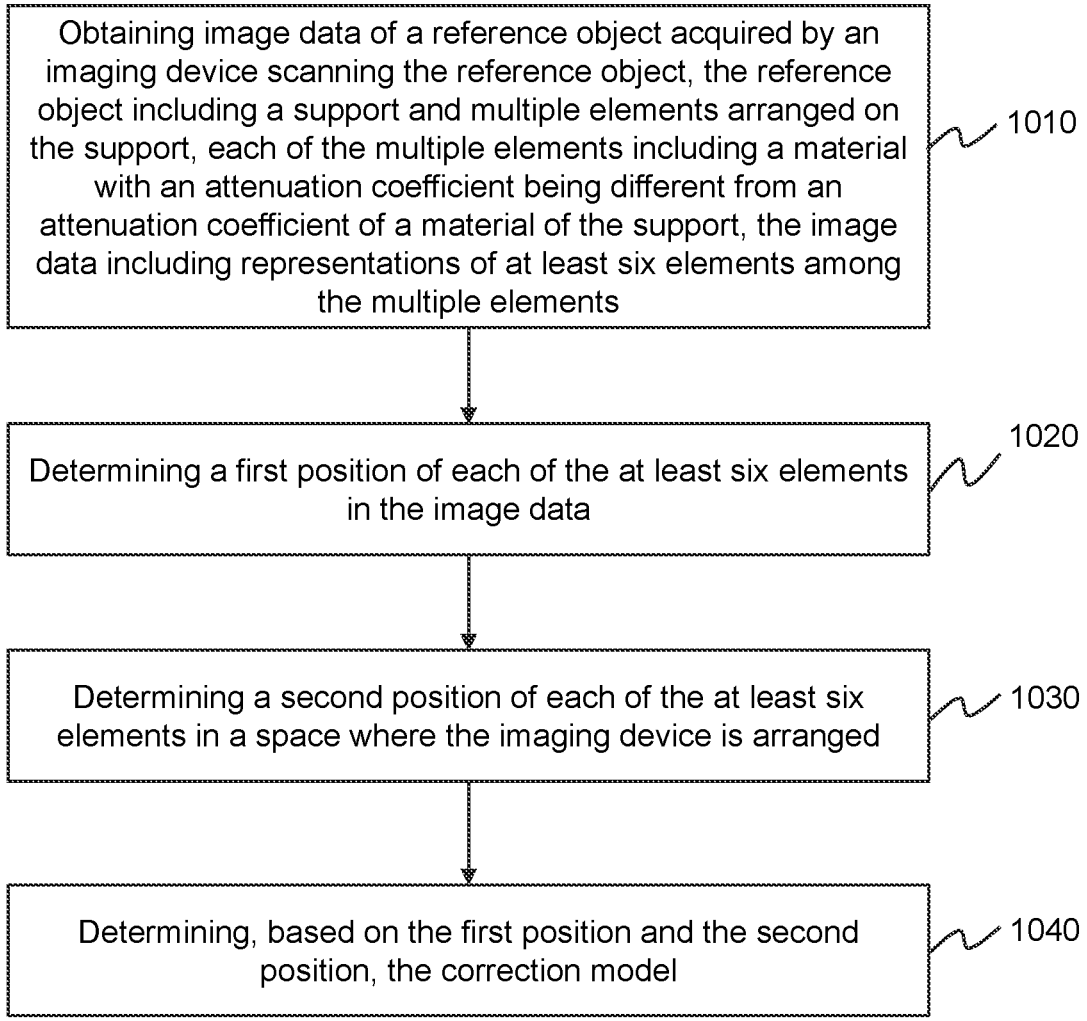
FIG. 10 is a schematic diagram illustrating an exemplary process for determining a calibration model according to some embodiments of the present disclosure.

The model determination module 720 may be configured to obtain a calibration model corresponding to each of at least a portion of a plurality of radiation sources. In some embodiments, multiple calibration models may be determined and stored in the storage device by a processing device that is the same as or different from the processing device 120. The model determination module 720 may determine one of the multiple calibration models corresponding to the radiation source and obtain the determined calibration model from the storage device. Ins some embodiments, the calibration models stored in the storage device may be updated from time to time, e.g., periodically or not according to process 1000 as illustrated in FIG. 10. For example, the calibration models stored in the storage device may be updated per week, per month, etc. In some embodiments, the model determination module 720 may determine the calibration model before the acquisition of the image data according to process 1000 as illustrated in FIG. 10.

The reconstruction module 730 may determine target image data of the subject based on the image data of the subject using the calibration model.

In some embodiments, the reconstruction module 730 may reconstruct the target image data (i.e., a target image) based on the image data (e.g., the projection data) and the multiple calibration models by performing a three-dimensional (3D) image reconstruction operation on the image data of the subject.

In some embodiments, the reconstruction module 730 may perform a 2D reconstruction operation on the projection data corresponding to each of at least a portion of the plurality of radiation sources to obtain one or more 2D images. The 2D reconstruction operation may be performed by the reconstruction module 730 using an iterative algorithm, an analytical algorithm, etc. The reconstruction module 730 may perform a 3D image reconstruction operation on the one or more 2D images corresponding to each of at least a portion of the plurality of radiation sources based on the calibration models.

It should be noted that the above description is merely provided for the purposes of illustration, and not intended to limit the scope of the present disclosure. Apparently, for persons having ordinary skills in the art, multiple variations and modifications may be conducted under the teachings of the present disclosure. However, those variations and modifications do not depart from the scope of the present disclosure. For example, the model determination module 720 may be integrated into the acquisition module 710 or omitted from the processing device 120.

FIG. 8 is a schematic flowchart illustrating an exemplary process for determining target image data according to some embodiments of the present disclosure. In some embodiments, process 800 may be implemented as a set of instructions (e.g., an application) stored in the storage device 130, storage 520, or storage 690. The processing device 120, the processor 510, and/or the CPU 640 may execute the set of instructions, and when executing the instructions, the processing device 120, the processor 510, and/or the CPU 640 may be configured to perform the process 800. The operations of the illustrated process presented below are intended to be illustrative. In some embodiments, the process 800 may be accomplished with one or more additional operations not described and/or without one or more of the operations discussed. Additionally, the order of the operations of the process 800 illustrated in FIG. 8 and described below is not intended to be limiting.

In 810, for each of at least a portion of a plurality of radiation sources, the processing device 120 (e.g., the acquisition module 710) may obtain image data of a subject acquired by an imaging device via scanning the subject based on radiation beams emitted by the radiation source.

The subject may be biological or non-biological. For example, the subject may include a patient, a man-made object, etc. As another example, the subject may include a specific portion, organ, and/or tissue of the patient. As still another example, the subject may include a breast.

In some embodiments, the imaging device (e.g., the medical device 110, the medical device 200, the medical device 300) may include the plurality of radiation sources and a detector. In some embodiments, the plurality of radiation sources (also referred to as light sources) may be arranged as an array to form a planar array radiation source. The detector may include a plurality of detecting units each of which is configured to receive radiation beams emitted from at least a portion of the plurality of radiation sources. Each of the plurality of radiation sources may correspond to at least a portion of the detecting units. The image data of the subject may be acquired by detecting units corresponding to each of the at least a portion of the plurality of radiation sources. In some embodiments, the imaging device may include a digital breast tomosynthesis (DBT) device. More descriptions regarding the imaging device may be found in FIGS. 1-3 and the descriptions thereof.

In some embodiments, the image data of the subject may include projection data acquired by the detector of the imaging device. The at least a portion of a plurality of radiation sources may operate separately to emit radiation beams toward the subject for the acquisition of the image data.

In some embodiments, the image data may be obtained from the imaging device (e.g., the medical device 110, the medical device 200, the medical device 300). For example, the medical device 110 may acquire the image data of the subject via scanning the subject based on the radiation beams emitted by the radiation source and transmit the acquired image data of the subject to the processing device 120. In some embodiments, the processing device 120 (e.g., the acquisition module 710) may obtain the image data of the subject from a storage device, for example, the storage device 130, or any other storage. For example, the medical device 110 may acquire the image data of the object via scanning the subject based on the radiation beams emitted by the radiation source and store the acquired image data of the subject in the storage device. The processing device 120 may obtain the image data of the subject from the storage device.

In 820, for each of at least a portion of the plurality of radiation sources, the processing device 120 (e.g., the acquisition module 710 or the model determination module 720) may obtain a calibration model corresponding to the radiation source.

The calibration model may indicate a transform relationship between a position of each pixel in an image of the subject and a position of a portion of the subject represented by the pixel in a space. In some embodiments, the calibration model may be denoted as a matrix, a function, etc. The calibration model may also be referred to as a calibration matrix, a transformation matrix, a projection matrix, or the like. In some embodiments, for different radiation sources, the calibration model may be different. In some embodiments, for different radiation sources, the calibration model may be the same. The calibration model may be obtained based on a reference object (e.g., the reference object 240 or the reference object as illustrated in FIG. 10). More descriptions regarding the determination of the calibration model may be found in FIG. 10 and the descriptions thereof.

In some embodiments, the calibration model may be obtained from a storage device, for example, the storage device 130, or any other storage. For example, multiple calibration models may be determined and stored in the storage device by a processing device that is the same as or different from the processing device 120. The processing device 120 may determine one of the multiple calibration models corresponding to the radiation source and obtain the determined calibration model from the storage device. Ins some embodiments, the calibration models stored in the storage device may be updated from time to time, e.g., periodically or not according to process 1000 as illustrated in FIG. 10. For example, the calibration models stored in the storage device may be updated per week, per month, etc. In some embodiments, the processing device 120 may obtain the calibration model before the acquisition of the image data according to process 1000 as illustrated in FIG. 10.

In 830, the processing device 120 (e.g., the reconstruction module 730) may determine target image data of the subject based on the image data of the subject using the calibration model.

In some embodiments, the processing device 120 may obtain the image data corresponding to at least a portion of the plurality of radiation sources and multiple calibration models each of which corresponds to the each of at least a portion of a plurality of radiation sources. The processing device 120 may reconstruct the target image data (i.e., a target image) based on the image data (e.g., the projection data) and the multiple calibration models. In some embodiments, the processing device 120 (e.g., the reconstruction module 730) may perform a three-dimensional (3D) image reconstruction operation on the image data of the subject to obtain the target image data (e.g., a 3D target image) of the subject based on the calibration models. The 3D image reconstruction operation may be formed by the processing device using a stepwise approximation algorithm, a forward-backward projection algorithm, a Fourier transform algorithm, or the like, or any combination thereof. For example, using the forward-backward projection algorithm, the processing device 120 may perform forward projection and backward projection based on the calibration model to reconstruct the target image data.

Since the calibration model indicates the transform relationship between a position of each pixel in the image data and a position of a portion of the subject represented by the pixel in the space, the processing device 120 may determine the target image data of the subject based on the image data of the subject using the calibration model. In some embodiments, when the target image data of the subject is reconstructed, the calibration model may be used for forward and backward projection on the image data, which may improve accuracy of the target image data of the subject.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted and/or one or more additional operations may be added. For example, operation 810 and operation 820 may be combined into a single operation. As another example, one or more other optional operations (e.g., a storing operation) may be added elsewhere in the process 800. In the storing operation, the processing device 120 may store information and/or data (e.g., the image data of the subject, the calibration model, the target image data, etc.) associated with the medical system 100 in a storage device (e.g., the storage device 130) disclosed elsewhere in the present disclosure.

Figure 9:
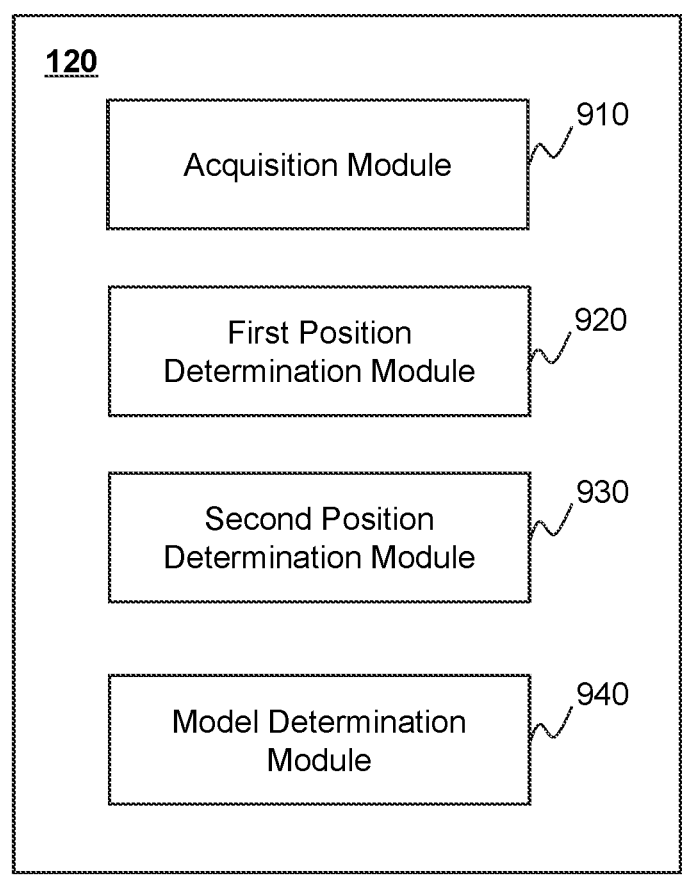
FIG. 9 is a block diagram illustrating an exemplary processing device according to some embodiments of the present disclosure.

FIG. 9 is a block diagram illustrating an exemplary processing device according to some embodiments of the present disclosure. In some embodiments, processing device 120 may be implemented on a computing device 500 (e.g., the processor 510) illustrated in FIG. 5 or a CPU 640 as illustrated in FIG. 6. As illustrated in FIG. 9, the processing device 120 may include an acquisition module 910, a first position determination module 920, a second position determination module 930, and a model determination module 940. Each of the modules described above may be a hardware circuit that is designed to perform certain actions, e.g., according to a set of instructions stored in one or more storage media, and/or any combination of the hardware circuit and the one or more storage media.

The acquisition module 910 may be configured to obtain image data of a reference object acquired by an imaging device scanning the reference object. The reference object may include a support (e.g., the support 1210) and multiple elements (e.g., the element 1220) arranged on the support. The image data of the reference object may include representations of at least six elements among the multiple elements of the reference object. In some embodiments, the image data of the reference image may be acquired by one of the plurality of radiation sources emitting radiation beams to scan the reference object. In some embodiments, the image data of the reference image may be acquired by at least a portion of the plurality of radiation sources emitting radiation beams to scan the reference object.

The first position determination module 920 may be configured to determine a first position of each of the at least six elements in the image data. Based on the image data of the reference object, the first position determination module 920 may determine the first position of each of the at least six elements in the image data. In some embodiments, the first position determination module 920 may determine the first position of each of the at least six elements from the image data using an identification technique (e.g., an image segmentation technique, a machine learning technique, etc.). In some embodiments, the first position determination module 920 may establish a coordinate system (also referred to as a first coordinate system) for the image data. The first coordinate system may also be referred to as an image coordinate system. In some embodiments, the first position determination module 920 may establish a coordinate system based on the projection plane of the radiation source on the detector (e.g., the detector 1320). The first coordinate system may include a rectangular plane coordinate system, a planar polar coordinate system, etc. In some embodiments, the coordinate system may be located in any plane parallel to the projection plane of the detector and an origin of the coordinate system may be any point in the plane.

The second position determination module 930 may be configured to determine a second position of each of the at least six elements in a space where the imaging device is arranged. In some embodiments, the second position of each of the at least six elements in the space may be denoted by a space coordinate system. The space coordinates system may also be referred to as a second coordinate system. In some embodiments, the second coordinate system may be a default setting of the imaging system 100. In some embodiments, the second position determination module 930 may establish the second coordinate system. The second position determination module 930 may determine any point as an origin of the second coordinate system. In some embodiments, the origin of the space coordinates system may be determined based on a default setting of the imaging device or by a user (e.g., a doctor, a technician, an operator, etc.). After establishing the second coordinate system, coordinates of a position of each component of the imaging device in the space may be determined according to a structure of the imaging device.

The model determination module 940 may be configured to determine, based on the first position and the second position, a calibration model. The calibration model may indicate a transform relationship between a position of each pixel in the image data and a position of a portion of a subject (e.g., an element in the reference object) represented by the pixel in a space. In some embodiments, the model determination module 940 may determine, based on the first position and the second position, and the arrangement of the at least six elements in the reference object, multiple pairs of positions. Each of the multiple pairs of positions may include the first position and the second position of the same element among the at least six elements. Since the image data of the reference object is generated after the radiation beams emitted from one or more of the plurality of radiation sources to the reference object, there may be a correspondence between the first position of each of the at least six elements in the image data and the second position of each of the at least six elements in the space. In some embodiments, when the at least six elements represented in the image data are arranged in one single layer in the reference object, the model determination module 940 may determine the first position and the second position of the same element in the at least six elements based on an arrangement position in the at least six elements in the image data and an arrangement position in the at least six elements in the reference object (or in the space). In some embodiments, when the at least six elements represented in the image data are arranged in two or more layers in the reference object, the model determination module 940 may determine the first position and the second position of the same element in the at least six elements based on an arrangement position in the at least six elements in the image data, an arrangement position in the at least six elements in the reference object (or in the space), and a size of an element in the image data. In some embodiments, for a radiation source, the first position of each of the at least six elements in the image data may be determined. Based on the correspondence between the first position and the second position, the second position of the element in the space may be determined. The first position and the second position of the same element may be determined as a pair of positions. In some embodiments, the model determination module 940 may determine, based on the multiple pairs of positions, the calibration model. Since both the first position and the second position of the same element among the at least six elements are represented as coordinates, the correspondence between a pair of the first position and the second position may be represented as a set of equations. More descriptions regarding the determination of the calibration model may be found in FIG. 8 and the descriptions thereof.

It should be noted that the above description is merely provided for the purposes of illustration, and not intended to limit the scope of the present disclosure. Apparently, for persons having ordinary skills in the art, multiple variations and modifications may be conducted under the teachings of the present disclosure. However, those variations and modifications do not depart from the scope of the present disclosure. For example, FIG. 10 is a schematic diagram illustrating an exemplary process for determining a calibration model according to some embodiments of the present disclosure. In some embodiments, process 1000 may be implemented as a set of instructions (e.g., an application) stored in the storage device 130, storage 520, or storage 690. The processing device 120, the processor 510, and/or the CPU 640 may execute the set of instructions, and when executing the instructions, the processing device 120, the processor 510, and/or the CPU 640 may be configured to perform the process 1000. The operations of the illustrated process presented below are intended to be illustrative. In some embodiments, the process 1000 may be accomplished with one or more additional operations not described and/or without one or more of the operations discussed. Additionally, the order of the operations of the process 1000 illustrated in FIG. 10 and described below is not intended to be limiting. In some embodiments, the calibration model described in connection with operation 820 in FIG. 8 may be obtained according to the process 1000.

In 1010, the processing device 120 (e.g., the acquisition module 910) may obtain image data of a reference object acquired by an imaging device scanning the reference object.

The reference object may include a support (e.g., the support 1210) and multiple elements (e.g., the element 1220) arranged on the support. Each of the multiple elements may include a material with an attenuation coefficient being different from an attenuation coefficient of a material of the support. More descriptions regarding the reference object may be found in FIG. 12 and the descriptions thereof.

In some embodiments, the imaging device (e.g., the medical device 110, the medical device 200, the medical device 300) may include a plurality of radiation sources and a detector. In some embodiments, when the reference object is located at a detection region of the imaging device, each of the plurality of radiation sources may cover at least a portion of the multiple elements in the reference object. In some embodiments, a center point of the reference object located at the detection region may be aligned with a center point of the plurality of radiation sources in the vertical direction. As used herein, a radiation source covering at least a portion of the multiple elements refers to that the at least a portion of the multiple elements are on transmission paths of radiation beams emitted by the radiation source. In other words, a radiation source covering at least a portion of the multiple elements refers to that the at least a portion of the multiple elements are in a radiation field of the radiation source. In some embodiments, the count (or number) of the at least a portion of the multiple elements covered by the radiation source may exceed or equal 6. Among the at least a portion of the multiple elements covered by the radiation source, each two elements in at least six elements may be not on the same transmission path of a radiation beam emitted by the radiation source. More descriptions regarding the imaging device may be found in FIGS. 1-3 and the descriptions thereof.

The image data of the reference object may include representations of at least six elements among the multiple elements of the reference object. Each of the at least six elements may be represented in the image data as a point. Positions of at least six elements represented in the image data may be different or not overlapped. As used herein, a position of an element represented in the image data refers to a position of a center of a point that represents the element.

Figure 11:
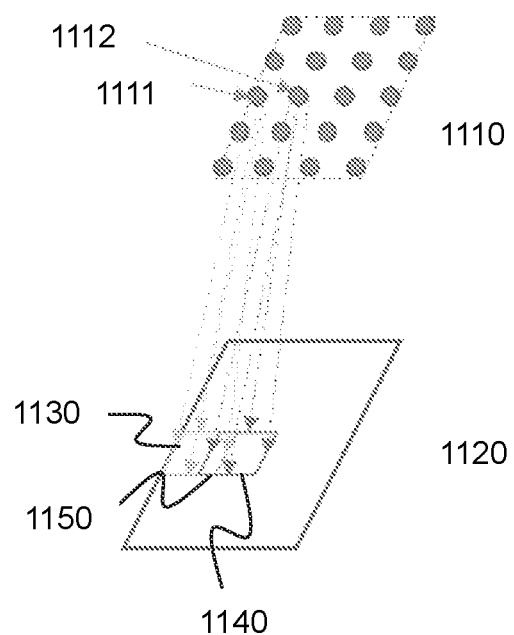
FIG. 11 is a schematic diagram illustrating imaging based on a planar array radiation source according to some embodiments of the present disclosure.

In some embodiments, the image data of the reference image may be acquired by one of the plurality of radiation sources emitting radiation beams to irradiate the reference object. For instance, the plurality of radiation sources may be controlled to emit radiation beams successively to scan the reference object. The image data of the reference object corresponding to each of the plurality of radiation sources may be obtained independently. Referring to FIG. 11, FIG. 11 is a schematic diagram illustrating imaging based on a planar array radiation source according to some embodiments of the present disclosure. As shown in FIG. 11, the planar array radiation source 1110 may include a plurality of radiation sources, such as radiation source 1111, a radiation source 1112, etc. The plurality of radiation sources in the planar array radiation source 1110 may be arranged at intervals on a plane (e.g., a support) parallel to a surface of a detector 1120. It should be noted that the planar array radiation source 1110 in FIG. 11 is an example, which may not be limited herein. For example, the plurality of radiation sources may be arranged at intervals on a curved surface parallel to the surface of the detector 1120. One or more radiation sources in the planar array radiation source 1110 may be controlled to emit the radiation beams successively to scan the reference object. For example, a position and a count of the radiation sources in the planar array radiation source 1110 may be controlled according to information of the reference object. As another example, a radiation dose of the radiation source in the planar array radiation source 1110 may be controlled according to an imaging requirement (e.g., a treatment planning, a treatment protocol, etc.). As still another example, the radiation dose of the radiation source may be controlled according to a requirement of image quality.

In some embodiments, each of the plurality of radiation sources may correspond to a projection region on the detector. As used herein, a radiation source corresponding to a projection region on the detector refers to that radiation beams emitted by the radiation source are received by detecting units in the projection region. As shown in FIG. 11, region 1130 is a projection region corresponding to the radiation source 1111, and region 1140 is a projection region corresponding to the radiation source 1112. When a radiation source (e.g., the radiation source 1111, the radiation source 1112, etc.) emits the radiation beams, detecting units in a corresponding projection region (e.g., the region 1130, the region 1140, etc.) may receive or detect radiation beams that pass through a portion of the reference object to generate the image data of the portion of the reference object. The image data of the portion of the reference object may represent elements in the portion of the reference object. In some embodiments, projection regions corresponding to two adjacent radiation sources may be overlapped partially. In other words, a portion of a projection region corresponding to one of the two adjacent radiation sources may be the same as a portion of a projection region corresponding to another one of the two adjacent radiation sources. In some embodiments, an overlapping projection region may be formed between adjacent radiation sources, such as an overlapping region 1150 formed between the region 1130 and the region 1140 in FIG. 11. During scanning the reference object, the plurality of radiation sources in the planar array radiation source 1110 may be controlled to emit the radiation beams successively to scan the reference object. Therefore, the image data of the reference object corresponding to each of the plurality of radiation sources may be obtained. That is, each of the plurality of radiation sources may respectively emit the radiation beams (e.g., X-rays) to irradiate the reference object to obtain the image data of the reference object.

In some embodiments, the image data of the reference image may be acquired by at least a portion of the plurality of radiation sources simultaneously emitting radiation beams to irradiate the reference object. For example, multiple radiation sources among which each two adjacent radiation sources that do not include an overlapping projection region may simultaneously emit radiation beams to irradiate the reference object, thereby reducing scanning time. It should be noted that if the multiple radiation sources are controlled to simultaneously emit the radiation beams, the projection regions corresponding to the multiple radiation sources may do not correspond to an overlapping projection region on the detector. That is, if two radiation sources include an overlapping projection region on the detector, the two radiation sources may be controlled to emit the radiation beams to irradiate the reference object separately. During an actual scanning, the plurality of radiation sources in the imaging device may be divided into one or more groups according to the above principle. The radiation sources in the same group may be configured to generate and emit radiation beams for scanning at the same time. Alternatively, the plurality of radiation sources in the imaging device may be used to scan the reference object successively at intervals.

After a radiation source in the planar array radiation source 1110 emits the radiation beams to the reference object, energy of the radiation beams may attenuate in the reference object, pass through the reference object, and be projected on the detector 1120. The detector 1310 may receive or detect radiation particles (e.g., neutrons, protons, electrons, μ-mesons, heavy ions, X-ray, γ-ray, ultraviolet, laser, etc.) in the radiation beams to obtain the image data of the reference object corresponding to the radiation source.

In 1020, the processing device 120 (e.g., the first position determination module 920) may determine a first position of each of the at least six elements in the image data.

Based on the image data of the reference object, the processing device 120 (e.g., the first position determination module 920) may determine the first position of each of the at least six elements in the image data. In some embodiments, the first position of each of the at least six elements may be determined from the image data using an identification technique (e.g., an image segmentation technique, a machine learning technique, etc.). For example, the processing device 120 may process the image data of the reference object based on an image segmentation technique to determine the first position of each of the at least six elements. Exemplary image segmentation techniques may include a region-based segmentation, an edge-based segmentation, a wavelet transform segmentation, a mathematical morphology segmentation, an artificial neural network-based segmentation, a genetic algorithm-based segmentation, or the like, or a combination thereof. As another example, the processing device 120 may process the image data of the reference object based on a trained machine learning model (also referred to as a position determination model). In some embodiments, the processing device 120 may retrieve the position determination model from a storage device (e.g., the storage device 130, the terminals(s) 140, or any other storage device) to process the image data of the reference object. For example, the position determination model may be determined by training a machine learning model offline based on a plurality of training samples using the processing device 120 or a processing device other than the processing device 120. The position determination model may be stored in the storage device 130, the terminals(s) 140, or any other storage device. For instance, the processing device 120 may retrieve the position determination model from the storage device 130, the terminals(s) 140, or any other storage device in response to receipt of a request for determining the first position of each of the at least six elements in the image data. In some embodiments, the processing device 120 may input the image data of the reference object into the position determination model. An output result may be generated by the position determination model. The output result of the position determination model may include the first position of each of the at least six elements in the image data.

In some embodiments, the processing device 120 may establish a coordinate system (also referred to as a first coordinate system) for the image data. The first coordinate system may also be referred to as an image coordinate system. In some embodiments, the processing device 120 may establish the first coordinate system based on the projection plane of the radiation source on the detector (e.g., the detector 1320). The first coordinate system may include a rectangular plane coordinate system, a planar polar coordinate system, etc. In some embodiments, the first coordinate system may be located in any plane parallel to the projection plane of the detector and an origin of the first coordinate system may be any point in the plane. For example, the processing device 120 may establish a rectangular plane coordinate system in the projection plane of the detector and set a midpoint of the projection plane as the origin of the rectangular plane coordinate system. Therefore, the first position of each of the at least six elements in the image data may be represented by the first coordinate system as two-dimension coordinates, such as $(u_i, v_i)$.

In 1030, the processing device 120 (e.g., the second position determination module 930) may determine a second position of each of the at least six elements in a space where the imaging device is arranged.

In some embodiments, the second position of each of the at least six elements in the space may be denoted by a space coordinate system. The space coordinates system may also be referred to as a second coordinate system. In some embodiments, the second coordinate system may be a default setting of the imaging system 100. For example, the second coordinate system may be set when the imaging device is mounted. In some embodiments, the processing device 120 may establish the second coordinate system. The processing device 120 may determine any point as an origin of the second coordinate system. For example, a midpoint of the plurality of radiation sources of the imaging device (e.g., the planar array radiation source 1110) may be determined as the origin of the space coordinates system. In some embodiments, the origin of the second coordinate system may be determined based on a default setting of the imaging device or by a user (e.g., a doctor, a technician, an operator, etc.). After establishing the second coordinate system, coordinates of a position of each component of the imaging device in the space may be determined according to a structure of the imaging device. For example, the coordinates of each radiation source and the detector may be determined. As another example, the second position of each element of the reference object in the space may be determined as three-dimension coordinates such as $(x_i, y_i, z_i)$.

In some embodiments, the imaging device under the space coordinate system may be displayed on a screen of a terminal (e.g., the terminal 140). Coordinates of the position of each component of the imaging device may be displayed directly or through clicked by a mouse.

In 1040, the processing device 120 (e.g., the model determination module 940) may determine, based on the first position and the second position, a calibration model. In some embodiments, the imaging device may include a plurality of radiation sources and each of the plurality of radiation sources may be configured to generate and emit radiation beams for scanning the reference object to obtain the image data. The calibration model determined based on the image data may correspond to one of the plurality of radiation sources that is used in the acquisition of the image data.

The calibration model may indicate a transform relationship between a position of each pixel in the image data and a position of a portion of a subject (e.g., an element in the reference object) represented by the pixel in a space.

In some embodiments, the processing device 120 may determine, based on the first position and the second position, and characteristics of the at least six elements in the reference object, multiple pairs of positions. Each pair of the multiple pairs of positions may include the first position and the second position of the same element among the at least six elements. In some embodiments, the characteristics of the at least six elements in the reference object may include an arrangement position of each element, a size of each element, a material of each element, etc. In some embodiments, each of the at least six elements may be represented in the image data as a point. The first position of an element in the image data may also be referred to as a first position of a point representing the element in the image data. The processing device 120 may determine the multiple pairs of positions by matching points and the at least six elements. A point matching an element refers to that the point in the image data representing the element.

In some embodiments, when the at least six elements represented in the image data are arranged in one single layer in the reference object, the processing device 120 may match the points and the at least six elements based on arrangement positions of the points in the image data and arrangement positions of the at least six elements in the reference object (or in the space). The first position of a point and the second position of an element that match the point may form a pair of positions. For example, if an element arranged in the at least six elements is located at a first column and a first row, and a point represented in the image data is located at a first column and a first row in the image data, the point and the element may be matched. The first position of the point and the second position of the element may be designated as a pair of positions. A matching relationship between the first position and the second position of the same element (or between a point and an element) may be established. As another example, if the at least six elements include materials with different attenuation coefficients, points representing the at least six elements in the image data may be with different gray values. The processing device 120 may match the points and the at least six elements based on the different gray values.

In some embodiments, when the at least six elements represented in the image data are arranged in two or more layers in the reference object, the processing device 120 may match the points and the at least six elements in the at least six elements based on arrangement positions of the at least six elements in the image data, arrangement positions of the at least six elements in the reference object (or in the space), and a size of each element in the image data. In some embodiments, the size of an element (e.g., diameter) represented in the image data may be related to a distance from the element to the radiation source. The shorter the distance from the element to the radiation source is, the greater the size of the element represented in the image data may be. In some embodiments, points representing elements arranged in different layers and aligned in the vertical direction may be closer with each other represented in the image data than elements in the same layer. The processing device 120 may determine points representing elements in the same layer according to the sizes of points. The processing device 120 may match points and elements in the same layer based on arrangement positions of the points in the image data and arrangement positions of the at least six elements in the reference object (or in the space) as described above.

Figure 12:
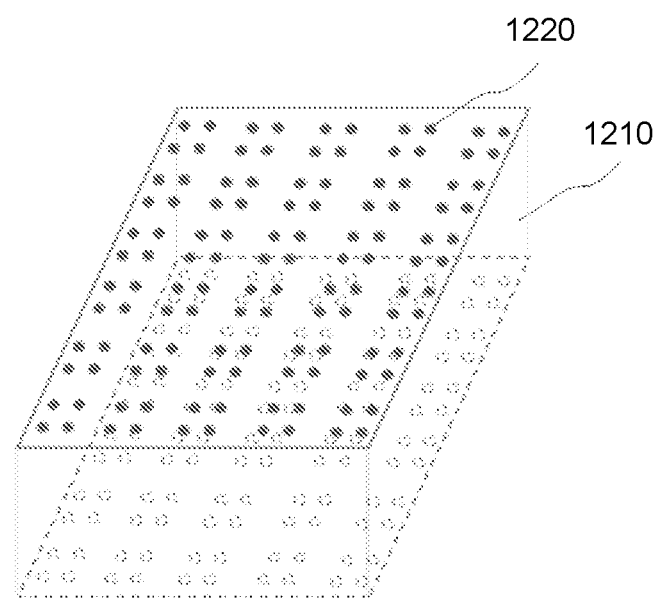
FIG. 12 is a schematic diagram illustrating an exemplary reference object according to some embodiments of the present disclosure.
Figure 13:
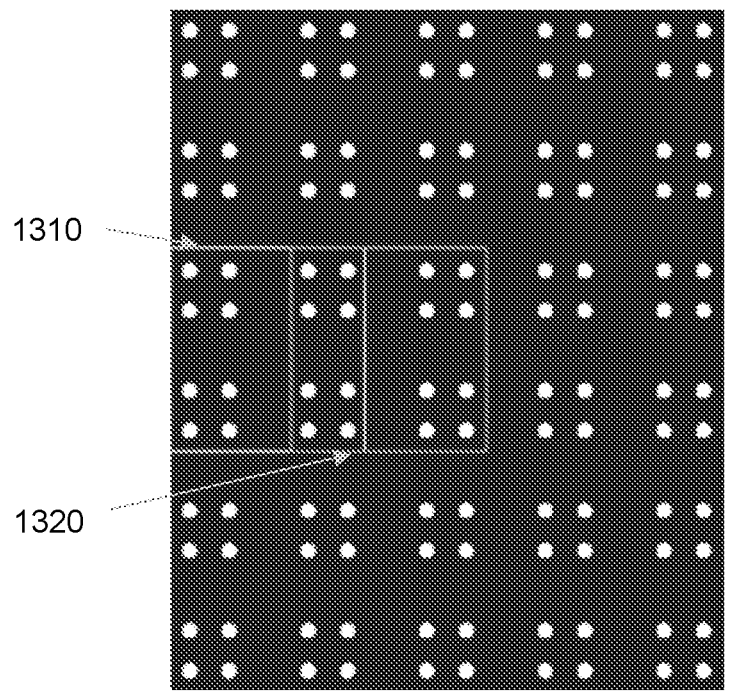
FIG. 13 is a schematic diagram illustrating an exemplary arrangement of elements in a reference object according to some embodiments of the present disclosure.
Figure 14:
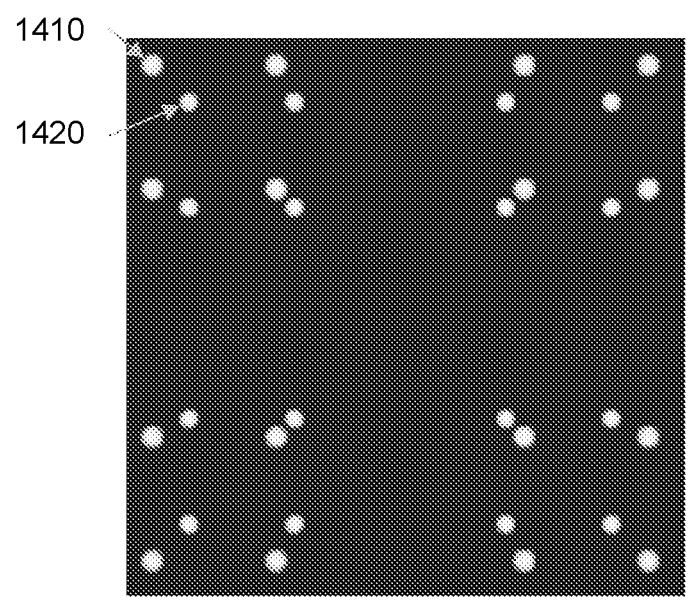
FIG. 14 is a schematic diagram illustrating imaging of elements in a reference object according to some embodiments of the present disclosure.

Referring to FIG. 12-14, FIG. 12 is a schematic diagram illustrating a reference object according to some embodiments of the present disclosure. Elements of the reference object are arranged in two layers. Elements in the two layers may be aligned in the vertical direction. FIG. 13 is a schematic diagram illustrating an arrangement of elements in one layer of the reference object according to some embodiments of the present disclosure. As shown in FIG. 13, region 1320 corresponds to a radiation source. Elements in the region 1320 are arranged in two layers, i.e., 32 elements.

FIG. 14 is a schematic diagram illustrating an image of elements in region 1320 according to some embodiments of the present disclosure. The image shown in FIG. 14 was acquired by the radiation source emitting radiation beams to scan elements in region 1320.

As shown in FIG. 14, a diameter of a point 1410 representing a specific element in the reference object as shown in FIG. 12 is larger than a diameter of the point 1420 representing another element in the reference object as shown in FIG. 12. The specific element corresponding to point 1410 and the another element corresponding to point 1420 may be arranged in different layers and aligned in the vertical direction. The specific element corresponding to the point 1410 is closer to the radiation source than the another element corresponding to the point 1420. In some embodiments, elements with the same diameter represented in the image data may be arranged in the same layer or have the same distance to the radiation source in the vertical direction.

In some embodiments, for a radiation source, the first position of each of the at least six elements in the image data may be determined. Based on the matching relationship between the first position and the second position, the second position of the element in the space may be determined. The first position and the second position of the same element may be determined as a pair of positions.

In some embodiments, the processing device 120 may determine, based on the multiple pairs of positions, the calibration model. Since both the first position and the second position of the same element among the at least six elements are represented as coordinates, the correspondence between a pair of the first position and the second position may be represented as a set of equations. For example, the first coordinate system may be a rectangular plane coordinate system located in the projection plane of the detector and a midpoint of the projection plane may be determined as the origin of the rectangular plane coordinate system, and a midpoint of the planar array radiation source may be determined as the origin of the second coordinates system. The count of elements represented in the image data may be represented by n. n may be a positive integer larger than or equal to 6, such as 6, 7, 8, 9, 10, 12, etc. The first position of an element represented in the image data may be represented as first coordinates $(u_i, v_i)$, and the second position of the element in the space may be represented as second coordinates $(x_i, y_i, z_i)$. i refers to a serial number of the element. i may be a positive integer. For each of the elements, the correspondence between the first coordinates and the second coordinates may be represented as the following Equations (1), (2), and (3):

$$u_i w_i = p_{11} x_i + p_{12} y_i + p_{13} z_i + p_{14}, \quad (1)$$

$$v_i w_i = p_{21} x_i + p_{22} y_i + p_{23} z_i + p_{24}, \quad (2)$$

$$w_i = p_{31} x_i + p_{32} y_i + p_{33} z_i + p_{34}. \quad (3)$$

By calculating the above Equations (1), (2) and (3) (e.g., Equation (1)−Equation (3)×$u_i$ and Equation (2)−Equation (3)×$v_i$), the following Equations (4) and (5) may be obtained.

$$p_{11} x_i + p_{12} y_i + p_{13} z_i + p_{14} - u_i (p_{31} x_i + p_{32} y_i + p_{33} z_i + p_{34}) = 0, \quad (4)$$

$$p_{21} x_i + p_{22} y_i + p_{23} z_i + p_{24} - v_i (p_{31} x_i + p_{32} y_i + p_{33} z_i + p_{34}) = 0. \quad (5)$$

Based on the elements corresponding to the radiation source, an Equation (6) may be obtained.

$$AP = 0. \tag{6}$$

where, $$A = \begin{bmatrix} x_1 & y_1 & z_1 & 1 & 0 & 0 & 0 & 0 & -u_1x_1 & -u_1y_1 & -u_zz_1 & -u_1 \\ 0 & 0 & 0 & 0 & x_1 & y_1 & z_1 & 1 & -v_1x_1 & -v_1y_1 & -v_1z_1 & -v_1 \\ x_2 & y_2 & z_2 & 1 & 0 & 0 & 0 & 0 & -u_2x_2 & -u_2y_2 & -u_2z_2 & -u_2 \\ 0 & 0 & 0 & 0 & x_2 & y_2 & z_2 & 1 & -v_2x_2 & -v_2y_2 & -v_2z_2 & -v_2 \\ \vdots & \vdots & \vdots & \vdots & \vdots & \vdots & \vdots & \vdots & \vdots & \vdots & \vdots & \vdots \\ x_n & y_n & z_n & 1 & 0 & 0 & 0 & 0 & -u_nx_n & -u_ny_n & -v_nz_n & -u_n \\ 0 & 0 & 0 & 0 & x_n & y_n & z_n & 1 & -v_nx_n & -v_ny_n & -v_nz_n & -v_n \end{bmatrix}.$$

Matrix A may be determined based on each pair of the multiple pairs of positions. Since the first coordinates and the second coordinates of the elements are determined, the matrix A may be obtained. The matrix P may be determined by solving Equation (6) through a mathematical manner.

$$P = (p_{11}, p_{12}, p_{13}, p_{14}, p_{21}, p_{22}, p_{23}, p_{24}, p_{31}, p_{32}, p_{33}, p_{34}). \tag{7}$$

The mathematical manner may include a singular value decomposition (SVD) manner, an elimination manner, a Cramer principle, a generalized inverse matrix law, a direct triangle law, a square root manner, a pursuit manner, or the like.

The matrix P may be the calibration model, which represents the transform relationship between the position of each pixel in the image data and the position of a portion of the subject represented by the pixel in the space. In some embodiments, for each radiation source, the processing device 120 may determine a corresponding calibration model. Therefore, a count of calibration models may be same as a count of the radiation sources. Since there are 12 unknowns in the matrix P according to the Equation (7), 12 equations may be needed to solve the matrix P. To obtain 12 equations, at least 6 elements may be obtained. In addition, the at least 6 elements represented in the image data may not overlap. That is, the first positions of six elements in the at least six elements may be different.

If the count of elements represented in the image data is less than 6, the count of different first positions may be determined less than 6, and the equations may not be solved to obtain matrix P.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted and/or one or more additional operations may be added. For example, operation 1010 and operation 1020 may be combined into a single operation. As another example, one or more other optional operations (e.g., a storing operation) may be added elsewhere in the process 1000. In the storing operation, the processing device 120 may store information and/or data (e.g., the image data of the reference object, the calibration model, the first position, the second position, etc.) associated with the medical system 100 in a storage device (e.g., the storage device 130) disclosed elsewhere in the present disclosure.

FIG. 12 is a schematic diagram illustrating an exemplary reference object according to some embodiments of the present disclosure. As shown in FIG. 12, the reference object may include a support 1210 and multiple elements 1220 arranged on the support 1210. The multiple elements 1220 may be spaced apart from each other.

A projection region of each radiation source may correspond to at least six elements 1220 and projection positions of each two or more elements among at least six elements 1220 in a projection plane of the radiation source may be not overlapped on a projection plane when radiation beams emitted by a radiation source in a planar array radiation source pass through the reference object. As used herein, the projection region of a radiation source refers to a region on the projection plane that the radiation beams emitted by the radiation source are projected on along projection directions. The projection plane refers to a plane on the detector where the radiation beams emitted by the radiation source are projected on along projection directions. The projection direction of a radiation beam may also be referred to as a transmission direction or path of the radiation beam. Each two or more elements among at least six elements 1220 may be not located at the same projection direction or transmission path.

A detector (e.g., the detector 232, the detector 310, the detector 1120) may receive radiation beams generated by the radiation source after passing through the reference object.

In some embodiments, each of the multiple elements 1220 may include a material with an attenuation coefficient being different from an attenuation coefficient of a material of the support 1210. Therefore, a difference between the attenuation coefficient of the element 1220 and the attenuation coefficient of the support 1210 may be used to distinguish a projection difference between the element 1220 and the support 1210, so that the element 1220 and the support 1210 may be distinguished in a projection image. In some embodiments, the attenuation coefficient of the element 1220 may be greater than the attenuation coefficient of the support 1210. Alternatively, the attenuation coefficient of the element 1220 may be smaller than the attenuation coefficient of the support 1210. As shown in FIG. 12, the attenuation coefficient of the element 1220 is greater than the attenuation coefficient of the support 1210. For example, the material of the support 1210 may include PMMA, and the material of the element 1220 may include steel.

In some embodiments, the attenuation coefficient of the multiple elements 1220 may be different. At least a portion of the multiple elements represented in a projection image may be distinguished from each other based on gray values of the elements represented in the projection image. In some embodiments, the attenuation coefficients of the multiple elements 1220 may be the same. At least a portion of the multiple elements 1220 represented in a projection image may be distinguished from each other based on an arrangement and/or sizes of the elements 1220 in the reference object. A shape of the element 1220 may include a sphere, a cylinder, a prism, a cube, etc. The specific shape of the element 1220 may not be limited in the embodiment. Merely by way of example, the shape of the element 1220 may be a sphere.

In some embodiments, the multiple elements 1220 may be distributed in layers on the support 1210. For example, the multiple elements 1220 may be arranged in one single layer in the support 1210. As another example, the multiple elements 1220 may be arranged in a plurality of layers (e.g., two layers, three layers, four layers, etc.) in support 1210. A count of layers of the multiple elements 1220 may not be limited, as long as the count of elements 1220 corresponding to each radiation source is greater than or equal to six.

In some embodiments, the multiple elements 1220 may be arranged in at least two layers in the support 1210. Each two or more elements among the at least six elements may not be located at the same projection direction of the radiation beams emitted by the radiation source. In some embodiments, as shown in FIG. 12, the multiple elements 1220 may be arranged in two layers. Two elements located in different layers may be aligned in the vertical direction such that the two elements may be not located at the same projection direction or transmission path of a radiation beam of the radiation source. The count (or number) of elements 1220 in each layer may be determined by the count of radiation sources. The count of elements 1220 covered by each radiation source may be the same, and the elements 1220 may not be overlapped on a projection direction of the radiation beams emitted by the radiation source. In some embodiments, the radiation source and a center point of a region including the at least six elements corresponding to or covered by the radiation source may be aligned in a vertical direction, which may ensure the accuracy of the measurement.

In some embodiments, elements in the same layer may be arranged at intervals. In some embodiments, elements covered by different radiation sources may be different or not overlapped. In other words, each element covered by a radiation source may be different from each element covered by another radiation source. In some embodiments, elements covered by different radiation sources may be overlapped at least in part. In other words, one or more elements covered by a radiation source may be covered by another radiation source. For example, FIG. 13 is a schematic diagram illustrating an arrangement of elements in one layer of the reference object in FIG. 12 according to some embodiments of the present disclosure. The multiple elements 1320 may be distributed in rows and columns. As shown in FIG. 13, elements in a dashed frame 1310 are elements covered by the radiation source 1111, and elements in a solid frame 1320 are elements covered by the radiation source 1112. A portion of elements in the dashed frame 1310 are overlapped with a portion of elements in the solid frame 1320.

In some embodiments, the arrangement of the elements covered by different radiation sources may be different or the same. For example, an interval between two elements among the elements corresponding to a radiation source may be different from or the same as an interval between two elements among the elements corresponding to another radiation source. As another example, the elements corresponding to a radiation source may be arranged in one single layer and the elements corresponding to another radiation source may be arranged in two or more layers.

In some embodiments, a distance (i.e., interval) between two adjacent elements among the plurality of elements may be determined based on a first distance between the planar array radiation source and/or the reference object and a second distance between the planar array radiation source and the detector. The greater the first distance between the planar array radiation source and the reference object, the greater the distance between two adjacent elements may be. The greater the second distance between the planar array radiation source and the detector, the greater the distance between two adjacent elements may be. For example, since it is necessary to distinguish which radiation source is the projection of the radiation source in the projection image, a certain distance must be maintained between multiple elements. The distance between the multiple elements may be determined according to the first distance between the planar array radiation source and the reference object, and the second distance between the planar array radiation source and the detector, as long as the separation distance may ensure that the projections of the elements do not overlap on the detector.

Figure 15:
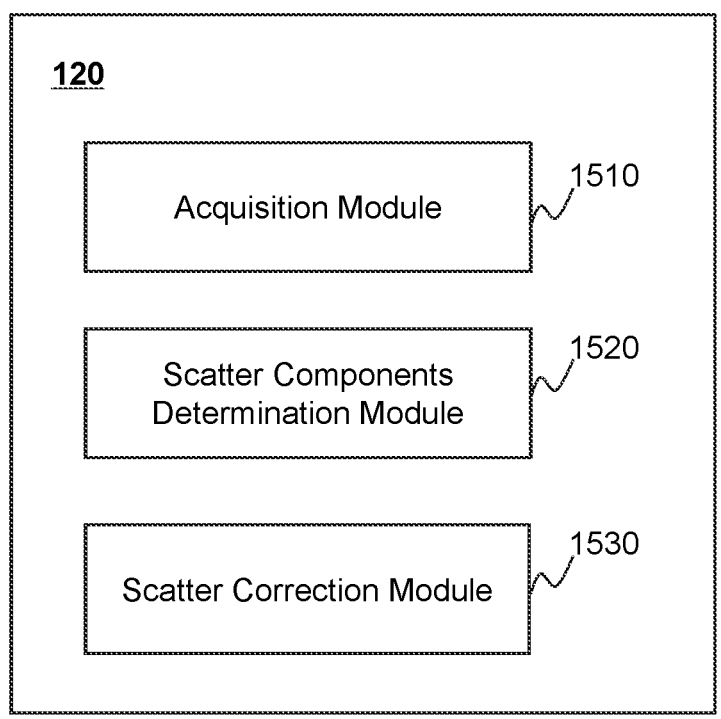
FIG. 15 is a block diagram illustrating another exemplary processing device according to some embodiments of the present disclosure.

FIG. 15 is a block diagram illustrating another exemplary processing device according to some embodiments of the present disclosure. In some embodiments, processing device 120 may be implemented on a computing device 500 (e.g., the processor 510) illustrated in FIG. 5 or a CPU 640 as illustrated in FIG. 6. As illustrated in FIG. 15, the processing device 120 may include an acquisition module 1510, a scatter components determination module 1520, and a scatter correction module 1530. Each of the modules described above may be a hardware circuit that is designed to perform certain actions, e.g., according to a set of instructions stored in one or more storage media, and/or any combination of the hardware circuit and the one or more storage media.

The acquisition module 1510 may be configured to obtain first image data of a subject acquired by an imaging device when a beam stop array is arranged on a path of radiation beams emitted by the radiation source for one of at least a portion of a plurality of radiation sources. The imaging device may include the plurality of radiation sources and a detector. The plurality of radiation sources may be arranged to form a planar array radiation source. The one of the at least a portion of the plurality of radiation sources may correspond to a beam stop array. The beam stop array may be configured to block radiation beams emitted the radiation source in the plurality of radiation sources when the beam stop array is arranged on the path (also referred to as a transmission path) of radiation beams emitted by the radiation source. In some embodiments, the acquisition module 1510 may control the beam stop array corresponding to the radiation source to move from a first position to a second position to block radiation beams emitted from the radiation source. The first position may be a position where the beam stop array is located such that radiation beams emitted the radiation source are not blocked. The second position may be a position where the beam stop array is located such that at least a portion of the radiation beams emitted from the radiation source are blocked. The first image data of the subject may include scatter components of the subject that are formed when the beam stop array is arranged on the path of radiation beams emitted by the radiation source. In some embodiments, the acquisition module 1510 may obtain the first image data formed by the radiation beams passing through the support of the beam stop array and the subject. In some embodiments, when the beam stop array is arranged on the path of radiation beams emitted by the radiation source, the radiation source may include a first radiation parameter. In some embodiments, the acquisition module 1510 may obtain the first image data from the imaging device (e.g., the medical device 110, the medical device 300). In some embodiments, the acquisition module 1510 may obtain the first image data of the subject from a storage device, for example, the storage device 130, or any other storage.

The acquisition module 1510 may be further configured to obtain second image data of the subject acquired by the imaging device when the beam stop array is not arranged on the path of radiation beams emitted by the radiation source for one of the at least a portion of the plurality of radiation sources. In some embodiments, the acquisition module 1510 may control the beam stop array corresponding to the radiation source to move from the second position to the first position such that the beam stop array is not arranged on the path of radiation beams emitted by the radiation source. The second image data of the subject may include a representation of the subject that is formed when the beam stop array is not arranged on the path of radiation beams emitted by the radiation source. When the beam stop array moves from the second position to the first position, the elements in the beam stop array may not block the radiation beams emitted by the radiation source. The acquisition module 1510 may acquire the second image data. In some embodiments, when the beam stop array is not arranged on the path of radiation beams emitted by the radiation source, the radiation source may include a second radiation parameter. In some embodiments, the acquisition module 1510 may obtain the second image data from the imaging device (e.g., the medical device 110, the medical device 300). In some embodiments, the acquisition module 1510 may obtain the second image data of the subject from a storage device, for example, the storage device 130, or any other storage.

The scatter components determination module 1520 may be configured to determine, based on the first image data, a scatter distribution associated with the subject included in the second image data for one of the at least a portion of the plurality of radiation sources. In some embodiments, the scatter components determination module 1520 may determine, based on the first image data, the scatter distribution associated with the subject included in the second image data. Since the first image data of the subject is acquired when the beam stop array is arranged on the path of radiation beams emitted from the radiation source, a region of the subject that is located on a path of radiation beams where the elements of the beam stop array are located may be not irradiated by the radiation beams that are blocked by the elements of the beam stop array. Therefore, image data corresponding to the region of the subject that is located on the path of radiation beams where the elements of the beam stop array are located in the first image data may be generated as the scattering of the subject when the radiation beams pass through the support of the beam stop array to irradiate the subject. In some embodiments, the scatter components determination module 1520 may designate the image data corresponding to the region of the subject that is located on the path of radiation beams where the elements of the beam stop array are located in the first image data as scatter distribution associated with the region of the subject included in the first image data. Since the scatter distribution associated with the region of the subject is a partial sparse sampling, the scatter components determination module 1520 may perform an interpolation operation on the scatter distribution associated with the region of the subject to obtain the scatter distribution associated with the subject included in the first image data. In some embodiments, the scatter distribution may be proportional to the radiation dose. The scatter components determination module 1520 may further determine the scatter distribution associated with the subject included in the second image data based on the first image data (or the interpolated scatter distribution), the first radiation dose, and the second radiation dose. In some embodiments, the p scatter components determination module 1520 may determine a ratio of the second radiation dose of the second image data and the first radiation dose of the first image data. Subsequently, the scatter components determination module 1520 may determine the scatter distribution associated with the subject included in the second image data based on the first image data (or the interpolated scatter distribution) and the ratio of the second radiation dose of the second image data and the first radiation dose of the first image data. More descriptions regarding the determination of the scatter distribution associated with the subject included in the second image data may be found in FIG. 16 and the descriptions thereof.

The scatter correction module 1530 may be configured to determine, based on the scatter distribution associated with the subject included in the second image data and the second image data, third image data of the subject corresponding to each of the at least a portion of the plurality of radiation sources for one of the at least a portion of the plurality of radiation sources. The third image data of the subject corresponding to each of the at least a portion of the plurality of radiation sources refers to image data of the subject after scatter correction. In some embodiments, the third image may be determined based on the scatter distribution associated with the subject included in the second image data and the second image. In some embodiments, the scatter correction module 1530 may determine, based on the scatter distribution and the second image data, the third image data. In some embodiments, the plurality of radiation sources may include a target portion in which each radiation source is not configured with a beam stop array. For the radiation source in the target portion (also referred to as a target radiation source), the scatter correction module 1530 may obtain fourth image data of the subject acquired by the target radiation source emitting radiation beams to scanning the subject. The fourth image data of the subject may include a scatter distribution of the subject that is generated under a radiation dose corresponding to the target radiation source. As used herein, the scatter distribution included in the fourth image data of the subject acquired based on the target radiation source may also be referred to as an estimated scatter distribution. In some embodiments, the scatter correction module 1530 may determine the estimation scanner distribution included in the fourth image data corresponding to the target radiation source based on one or more scatter distributions included in second image data corresponding to one or more reference radiation sources. In some embodiments, the scatter correction module 1530 may determine the estimated scatter distribution included in the fourth image data by performing an interpolation operation on the one or more scatter distributions included in the second image data corresponding to the reference radiation sources. In some embodiments, the scatter correction module 1530 may determine the estimation scatter distribution included in the fourth image data corresponding to the target radiation source based on the first image data corresponding to one or more reference radiation sources. In some embodiments, after determining the third image data of the subject corresponding to each of the plurality of radiation sources, the scatter correction module 1530 may determine, based on the third image data of the subject corresponding to each of the plurality of radiation sources, target image data of the subject. In some embodiments, the scatter correction module 1530 may perform a reconstruction operation on the third image data of the subject corresponding to the plurality of radiation sources. In some embodiments, the scatter correction module 1530 may perform a reconstruction operation on the third image data of the subject corresponding to the plurality of radiation sources using the calibration model as described elsewhere in the present disclosure.

It should be noted that the above description is merely provided for the purposes of illustration, and not intended to limit the scope of the present disclosure. Apparently, for persons having ordinary skills in the art, multiple variations and modifications may be conducted under the teachings of the present disclosure. However, those variations and modifications do not depart from the scope of the present disclosure. For example, the scatter correction module 1530 and the scatter components determination module 1520 may be integrated into one single module.

Figure 16:
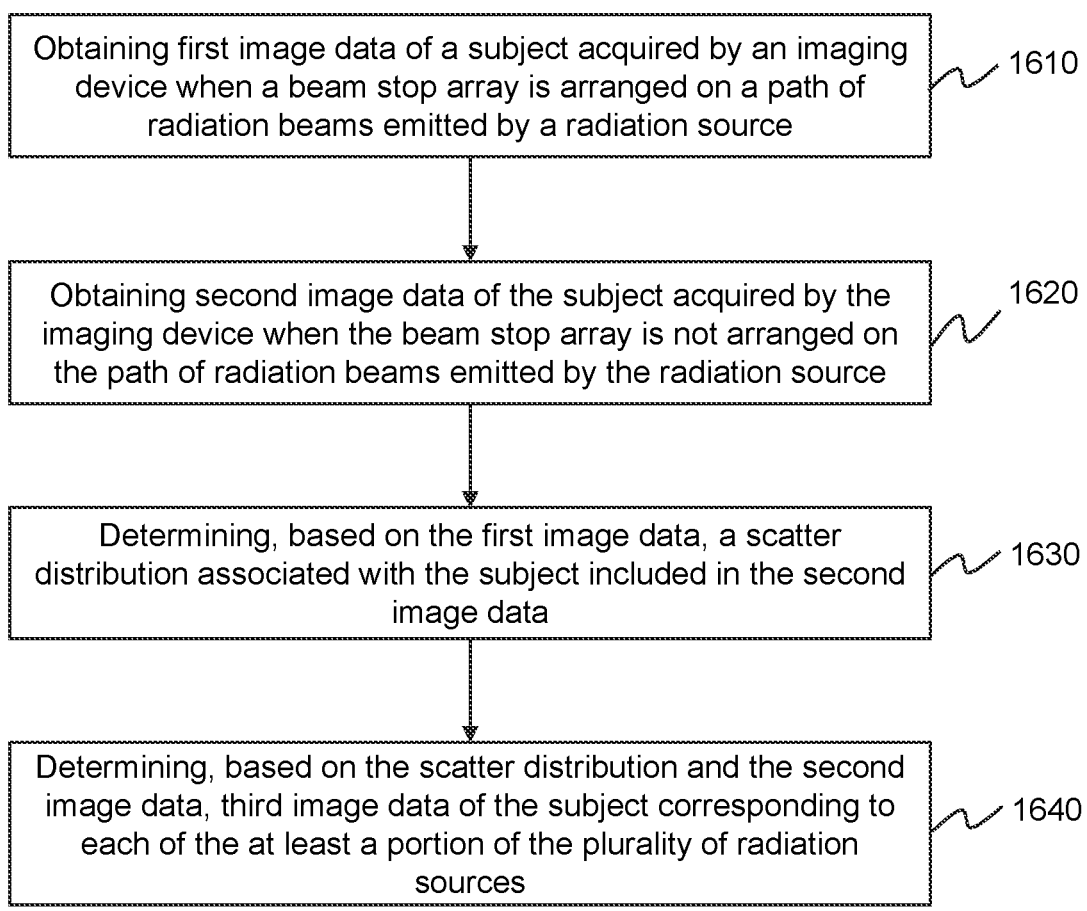
FIG. 16 is a schematic diagram illustrating an exemplary process for determining target image data of a subject according to some embodiments of the present disclosure.

FIG. 16 is a schematic diagram illustrating an exemplary process for determining image data of a subject according to some embodiments of the present disclosure. In some embodiments, process 1600 may be implemented as a set of instructions (e.g., an application) stored in the storage device 130, storage 520, or storage 690. The processing device 120, the processor 510, and/or the CPU 640 may execute the set of instructions, and when executing the instructions, the processing device 120, the processor 510, and/or the CPU 640 may be configured to perform the process 1600. The operations of the illustrated process presented below are intended to be illustrative. In some embodiments, the process 1600 may be accomplished with one or more additional operations not described and/or without one or more of the operations discussed. Additionally, the order of the operations of the process 1600 illustrated in FIG. 16 and described below is not intended to be limiting.

In 1610, for one of at least a portion of a plurality of radiation sources, the processing device 120 (e.g., the acquisition module 1510) may obtain first image data of a subject acquired by an imaging device when a beam stop array is arranged on a path of radiation beams emitted by the radiation source.

The subject may be biological or non-biological. For example, the subject may include a patient, a man-made object, etc. As another example, the subject may include a specific portion, organ, and/or tissue of the patient. As still another example, the subject may include a breast.

In some embodiments, the imaging device (e.g., the medical device 110, the medical device 300) may include the plurality of radiation sources and a detector. The plurality of radiation sources may be arranged to form a planar array radiation source (e.g., the radiation beam generation component 330). In some embodiments, the imaging device may include a digital breast tomosynthesis (DBT) device. More descriptions regarding the imaging device may be found in FIGS. 1, 3, and the descriptions thereof.

The one of the at least a portion of the plurality of radiation sources may correspond to a beam stop array (e.g., the beam stop array 350). The beam stop array may be configured to block radiation beams emitted from the radiation source in the plurality of radiation sources when the beam stop array is arranged on paths (also referred to as a transmission paths) of radiation beams emitted by the radiation source. For example, the elements in the beam stop array with the high attenuation coefficient may absorb energy of radiation beams irradiating the elements, such that at least a portion of the radiation beams may be blocked by the beam stop array. In some embodiments, the processing device 120 may control the beam stop array corresponding to the radiation source to move from a first position to a second position to block radiation beams emitted from the radiation source. The first position may be a position where the beam stop array is located such that radiation beams emitted the radiation source are not blocked. In other words, the first position may be not on the transmission path of the radiation beams emitted the radiation source. When the beam stop array is located at the first position, the beam stop array may not block radiation beams of the radiation source. The second position may be a position where the beam stop array is located such that at least a portion of the radiation beams emitted from the radiation source are blocked. That is, when the beam stop array is located at the second position, the beam stop array may block at least a portion of the radiation beams emitted from the radiation source. In other words, the second position may be on the transmission paths of the radiation beams emitted the radiation source.

In some embodiments, the beam stop array may be installed on a guide rail and moved from the first position to the second position by sliding. In some embodiments, the beam stop array may be installed on a turntable and moved from the first position to the second position by rotating. In some embodiments, each of the at least a portion of the plurality of radiation sources may correspond to a beam stop array. The at least a portion of the plurality of radiation sources may correspond to multiple beam stop arrays. When the acquisition of the first image data is performed, one of the multiple beam stop arrays corresponding to each of the at least a portion of the plurality of radiation sources may be moved to the corresponding second position for the acquisition of the first image data for each of the at least a portion of the plurality of radiation sources. In some embodiments, the at least a portion of the plurality of radiation sources may correspond to one single beam stop array. And when the acquisition of the first image data is performed, the one single beam stop array may be moved to the corresponding second position for the acquisition of the first image data for each of the at least a portion of the plurality of radiation sources. More descriptions for the beam stop array may be found in elsewhere in the present disclosure (e.g., FIGS. 3 and 4, and the description thereof).

The first image data of the subject may include scatter components of the subject that are formed when the beam stop array is arranged on the path of radiation beams emitted by the radiation source. In some embodiments, when the beam stop array moves from the first position to the second position, the elements in the beam stop array with higher attenuation coefficients may block the radiation beams emitted by the radiation source. The elements of the beam stop array with higher attenuation coefficients may block a portion of the radiation beams emitted by the radiation source, and a portion of the radiation beams emitted by the radiation source may pass through the support of the beam stop array with the lower attenuation coefficient. The radiation beams passing through the support of the beam stop array may irradiate and pass through the subject to form scattering in the subject. The processing device 120 may obtain the first image data formed by the radiation beams passing through the support of the beam stop array and the subject.

In some embodiments, when the beam stop array is arranged on the path of radiation beams emitted by the radiation source, the radiation source may include a first radiation parameter. The first radiation parameter may include a first position of the radiation source, a first radiation dose of the radiation source, etc. In some embodiments, the first radiation parameter may be determined by a treatment planning. The treatment planning may be used to indicate scanning requirements of the subject. In some embodiments, the treatment planning may include a scanning region, a radiation dose, a reference dose, an image sequence, or the like. The processing device 120 may obtain the treatment planning manually or automatically. For example, the processing device 120 may obtain the treatment planning manually input by a user (e.g., a doctor, a technician, an operator, etc.) through a terminal (e.g., the terminal 140). For another example, the processing device 120 may automatically determine (e.g., using a machine learning method) a corresponding treatment planning based on historical data and current data of the subject.

In some embodiments, the first image data may include first projection data of the subject corresponding to the radiation source acquired by the detector when the beam stop array is arranged on the path of radiation beams emitted by the radiation source. In some embodiments, the first image data may include a first image reconstructed based on the first projection data. In some embodiments, the first image data may include the first image reconstructed based on the first projection data and a calibration model as described elsewhere in the present disclosure (e.g., FIG. 8 and the descriptions thereof).

In some embodiments, the first image data may be obtained from the imaging device (e.g., the medical device 110, the medical device 300). For example, the medical device 300 may acquire the first image data of the subject when the beam stop array is arranged on the path of radiation beams emitted by the radiation source and transmit the acquired first image data of the subject to the processing device 120. In some embodiments, the processing device 120 (e.g., the third obtaining module 1610) may obtain the first image data of the subject from a storage device, for example, the storage device 130, or any other storage. For example, the medical device 300 may acquire the first image data of the subject when the beam stop array is arranged on the path of radiation beams emitted by the radiation source and store the acquired first image data of the subject in the storage device. The processing device 120 may obtain the first image data of the subject from the storage device.

In 1620, for one of the at least a portion of the plurality of radiation sources, the processing device 120 (e.g., the acquisition module 1510) may obtain second image data of the subject acquired by the imaging device when the beam stop array is not arranged on the path of radiation beams emitted by the radiation source.

In some embodiments, the processing device 120 may control the beam stop array corresponding to the radiation source to move from the second position to the first position such that the beam stop array is not arranged on the path of radiation beams emitted by the radiation source.

The second image data of the subject may include a representation of the subject that is formed when the beam stop array is not arranged on the path of radiation beams emitted by the radiation source. When the beam stop array moves from the second position to the first position, the elements in the beam stop array may not block the radiation beams emitted by the radiation source. After the beam stop array moves from the second position to the first position, the processing device 120 may acquire the second image data.

In some embodiments, when the beam stop array is not arranged on the path of radiation beams emitted by the radiation source, the radiation source may include a second radiation parameter. The second radiation parameter may include a second position of the radiation source, a second radiation dose, etc. In some embodiments, the second radiation parameter may be determined by the treatment planning. In particular, a sum of the first radiation dose and the second radiation dose may be less than a dose threshold. The dose threshold refers to a maximum radiation dose of the subject in the acquisition of image data of the subject. For example, the dose threshold may be determined by the treatment planning. As another example, the dose threshold may be determined by the user or according to a default setting of the system 100. In some embodiments, the first radiation dose of the first image data may be less than the second radiation dose of the second image data.

The second image data may include second projection data of the subject corresponding to the radiation source acquired by the detector when the beam stop array is not arranged on the path of radiation beams emitted by the radiation source. In some embodiments, the second image data may include a second image reconstructed based on the second projection data. In some embodiments, the second image may be reconstructed based on the second projection data and a calibration model as described elsewhere in the present disclosure (e.g., FIG. 8 and the descriptions thereof). In some embodiments, if the first image is reconstructed based on the calibration model, the second image may be reconstructed based on the calibration model.

In some embodiments, the second image data may be obtained from the imaging device (e.g., the medical device 110, the medical device 300). For example, the medical device 300 may acquire the second image data of the subject when the beam stop array is not arranged on the path of radiation beams emitted by the radiation source and transmit the acquired second image data of the subject to the processing device 120. In some embodiments, the processing device 120 (e.g., the scatter components determination module 1520) may obtain the second image data of the subject from a storage device, for example, the storage device 130, or any other storage. For example, the medical device 300 may acquire the second image data of the subject when the beam stop array is not arranged on the path of radiation beams emitted by the radiation source and store the acquired second image data of the subject in the storage device. The processing device 120 may obtain the second image data of the subject from the storage device.

In 1630, for one of the at least a portion of the plurality of radiation sources, the processing device 120 (e.g., the scatter components determination module 1520) may determine, based on the first image data, a scatter distribution associated with the subject included in the second image data.

In some embodiments, the processing device 120 may determine, based on the first image data, the scatter distribution associated with the subject included in the second image data. Since the first image data of the subject is acquired when the beam stop array is arranged on the path of radiation beams emitted from the radiation source, portions of the subject located on paths of radiation beams where the elements of the beam stop array are located on may be not irradiated by the radiation beams that are blocked by the elements of the beam stop array. Therefore, regions in the first image data representing the portions of the subject located on the paths of radiation beams where the elements of the beam stop array are located may be generated as the scattering of the subject when the radiation beams pass through the support of the beam stop array to irradiate the subject.

In some embodiments, regions in the first image data representing the portions of the subject located on the paths of radiation beams where the elements of the beam stop array are located may be designated as scatter data associated with the portions of the subject included in the first image data. In some embodiments, the regions in the first image data may be represented as multiple light strips with gray values exceeding other regions in the first image data represented as black strips relative to the light strips. The processing device 120 may determine the scatter data in the first image data based on pixel values in the other regions of the first image data represented as the black strips. For example, the pixel values in the other regions of the first image data represented as the black strips may be designated as pixel values in the scatter data. In some embodiments, the processing device 120 may perform an interpolation operation on the scatter data associated with the portions of the subject to obtain the scatter distribution associated with the subject included in the second image data. The interpolation operation may include a polynomial interpolation operation, a spline interpolation operation, a Lagrangian interpolation operation, a Newton interpolation operation, a Hermitian interpolation operation, a piecewise interpolation operation, etc.

In some embodiments, the first radiation dose may be different from the second radiation dose, and the scatter distribution associated with the subject included in the second image data may be determined based on the first image data (or the interpolated scatter distribution), the first radiation dose, and the second radiation dose. In some embodiments, the scatter distribution may be proportional to the radiation dose. The greater the radiation dose is, the greater the scatter distribution may be. Therefore, the processing device 120 may further determine the scatter distribution associated with the subject included in the second image data based on the first image data (or the interpolated scatter distribution), the first radiation dose, and the second radiation dose. In some embodiments, the processing device 120 may determine a ratio of the second radiation dose of the second image data and the first radiation dose of the first image data. Subsequently, the processing device 120 may determine the scatter distribution associated with the subject included in the second image data based on the scatter data (or the interpolated scatter data) and the ratio of the second radiation dose of the second image data and the first radiation dose of the first image data. For example, if the first radiation dose is 1 mSV and the second radiation dose is 5 mSV, the ratio of the second radiation dose of the second image data and the first radiation dose of the first image data may be 5. The scatter distribution associated with the subject included in the second image data may be determined as a product of the ratio (e.g., 5) and the interpolated scatter data. In some embodiments, the interpolated scatter data may be denoted as a first matrix, and the scatter distribution associated with the subject included in the second image data may be denoted as a scatter matrix. The scatter matrix may be obtained by multiplying the first matrix with the ratio of the second radiation dose of the second image data and the first radiation dose of the first image data.

In 1640, for one of the at least a portion of the plurality of radiation sources, the processing device 120 (e.g., the scatter correction module 1530) may determine, based on the scatter distribution associated with the subject included in the second image data and the second image data, third image data of the subject corresponding to each of the at least a portion of the plurality of radiation sources.

The third image data of the subject corresponding to each of the at least a portion of the plurality of radiation sources refers to image data of the subject after scatter correction. In some embodiments, the third image data may not include the scatter distribution associated with the subject included in the second image data. In some embodiments, the third image data may include third projection data that are determined based on the scatter distribution associated with the subject included in the second image data and the second projection data. In some embodiments, the third image data may include a third image reconstructed based on the third projection data. In some embodiments, the third image may be reconstructed based on the third projection data and the calibration model as described elsewhere in the present disclosure (e.g., FIG. 8 and the descriptions thereof). In some embodiments, the third image may be determined based on the scatter distribution associated with the subject included in the second image data and the second image.

In some embodiments, the processing device 120 may determine, based on the scatter distribution and the second image data, the third image data. For example, the processing device 120 may determine the third image data of the subject corresponding to each of the at least a portion of the plurality of radiation sources by subtracting the scatter distribution associated with the subject included in the second image data from the second image data. For example, the scatter distribution associated with the subject included in the second image data may be denoted as the scatter matrix, the second image data may be denoted as a second matrix, and the third image data may be denoted as a third matrix. The third image data may be obtained by performing a subtraction operation between the first matrix from the second matrix.

In some embodiments, the plurality of radiation sources may include a target portion in which each radiation source is not configured with a beam stop array. For the radiation source in the target portion (also referred to as a target radiation source), the processing device 120 may obtain fourth image data of the subject acquired by the target radiation source emitting radiation beams to scanning the subject. The fourth image data of the subject may include a scatter distribution of the subject that is generated under a radiation dose corresponding to the target radiation source.

As used herein, the scatter distribution included in the fourth image data of the subject acquired based on the target radiation source may also be referred to as an estimated scatter distribution. In some embodiments, the processing device 120 may determine the estimation scanner distribution included in the fourth image data corresponding to the target radiation source based on one or more scatter distributions included in second image data corresponding to one or more reference radiation sources. As used herein, image data of a subject corresponding to a radiation source refers to that the image data is acquired by the radiation source emitting radiation beams to irradiate the subject. A reference radiation source refers to a radiation source configured with a beam stop array. In some embodiments, the reference radiation source of the target radiation source may be determined according to a distance between the reference radiation source and the target radiation source. For example, a radiation source configured with a beam stop array whose distance to the target radiation source in the target portion is less than a distance threshold (e.g., 10 millimeters, 20 millimeters, 30 millimeters, 50 millimeters, 80 millimeters, 100 millimeters, etc.) may be determined as a reference radiation source of the target radiation source. As another example, a count of (e.g., 1, 2, 3, 4, 5, 6, 8, 10, 12, etc.) radiation sources configured with the beam stop arrays closest to the target radiation source in the target portion may be determined as the reference radiation sources of the target radiation source. In some embodiments, a reference radiation source may be determined according to a target portion of the subject irradiated by the target radiation source in the target portion. In some embodiments, a radiation source that irradiates the same portion of the subject with the target radiation source may be determined as the reference radiation source of the target radiation source. For example, if a target portion of the subject irradiated by the target radiation source in the target portion is a leg, the radiation source configured with the beam stop array that irradiates at least a portion of the leg may be determined as the reference radiation source of the target radiation source.

In some embodiments, the processing device 120 may determine the estimated scatter distribution included in the fourth image data by performing an interpolation operation on the one or more scatter distributions included in the second image data corresponding to the reference radiation sources. The interpolation operation may include a polynomial interpolation operation, a spline interpolation operation, a Lagrangian interpolation operation, a Newton interpolation operation, a Hermitian interpolation operation, a piecewise interpolation operation, etc. After determining the estimated scatter distribution included in the fourth image data, the processing device 120 may determine, based on the fourth image data and the scatter distribution included in the fourth image data, third image data of the subject corresponding to the target radiation source. For example, the processing device 120 may determine the third image data of the subject corresponding to the target radiation source by subtracting the estimated scatter distribution included in the fourth image data from the fourth image data.

In some embodiments, the processing device 120 may determine the estimation scatter distribution included in the fourth image data corresponding to the target radiation source based on the first image data corresponding to one or more reference radiation sources. The processing device 120 may determine scatter data based on the first image data corresponding to one or more reference radiation sources. The processing device 120 may determine the estimation scatter data corresponding to the fourth image data by interpolating the scatter data corresponding to one or more reference radiation sources. The processing device 120 may perform an interpolating operation on the estimation scatter data corresponding to the fourth image data to obtain interpolated estimation scatter data corresponding to the fourth image data. The processing device 120 may determine the estimation scatter distribution included in the fourth image data by multiplying the interpolated estimation scatter data with a ratio of a radiation dose corresponding to the target radiation source and a radiation dose corresponding to a reference radiation source.

In some embodiments, after determining the third image data of the subject corresponding to each of the plurality of radiation sources, the processing device 120 may determine, based on the third image data of the subject corresponding to each of the plurality of radiation sources, target image data of the subject. In some embodiments, the processing device 120 may perform a three-dimensional (3D) reconstruction operation on the third image data of the subject corresponding to the plurality of radiation sources. In some embodiments, the third image data may include third projection data. The processing device 120 may reconstruct one or more 2D third images based on the third projection data using a 2D reconstruction technique. In some embodiments, the third image data may include one or more reconstructed 2D third images. The processing device 120 may perform the 3D reconstruction operation on the 2D third images to obtain the target image data (i.e., a 3D target image). The 3D reconstruction operation may be performed by the processing device 120 using a multiplanar reconstruction (MPR) technique, a maximum intensity projection (MIP) technique, a surface shaded display (SSD) technique, a volume roaming technique (VRT), a curved planar reconstruction (CPR) technique, or the like, or a combination thereof. In some embodiments, the processing device 120 may perform a 3D reconstruction operation on the third projection data of the subject corresponding to the plurality of radiation sources using the calibration model as described elsewhere in the present disclosure.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted and/or one or more additional operations may be added. For example, operation 1610 and operation 1620 may be combined into a single operation. As another example, one or more other optional operations (e.g., a storing operation) may be added elsewhere in the process 1600. In the storing operation, the processing device 120 may store information and/or data (e.g., the first image data of the subject, the second image data of the subject, the third image data of the subject, the fourth image data of the subject, the scatter distribution, the estimated scanner distribution, etc.) associated with the medical system 100 in a storage device (e.g., the storage device 130) disclosed elsewhere in the present disclosure. As still another example, before performing operation 1610 to operation 1640, the processing device 120 may obtain the treatment planning and determine the first radiation parameter and the second radiation parameter.

Figure 17:
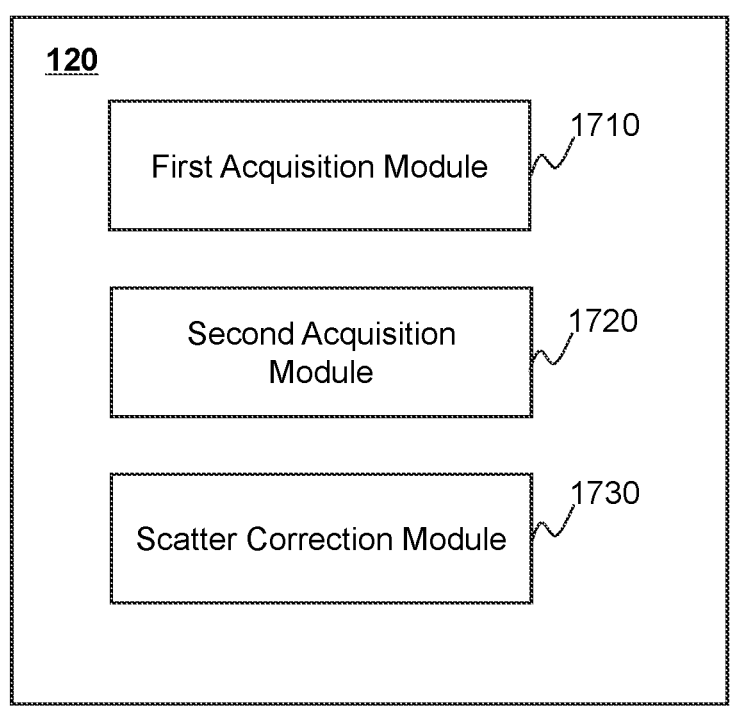
FIG. 17 is a block diagram illustrating another exemplary processing device according to some embodiments of the present disclosure.

FIG. 17 is a block diagram illustrating an exemplary processing device according to some embodiments of the present disclosure. In some embodiments, processing device 120 may be implemented on a computing device 500 (e.g., the processor 510) illustrated in FIG. 5 or a CPU 640 as illustrated in FIG. 6. As illustrated in FIG. 7, the processing device 120 may include a first acquisition module 1710, a second acquisition module 1720, and a scatter correction module 1730. Each of the modules described above may be a hardware circuit that is designed to perform certain actions, e.g., according to a set of instructions stored in one or more storage media, and/or any combination of the hardware circuit and the one or more storage media.

The first acquisition module 1710 may be configured to obtain image data of a subject acquired by an imaging device via scanning the subject based on radiation beams emitted by the radiation source for one of a plurality of radiation sources. The image data may include scatter data caused by a scattering of at least a portion of the radiation beams passing through the subject. The image data may be the same as or similar to the second image data or the fourth image data as described in FIG. 16. More descriptions regarding obtaining the image data of the subject may be found in FIG. 16 and the descriptions thereof.

The second acquisition module 1720 may be configured to obtain a trained machine learning model for one of the plurality of radiation sources. In some embodiments, the trained machine learning model may be a process or an algorithm that is configured to processing the image data of the subject. In some embodiments, the trained machine learning model may include a convolutional neural network (CNN) model, a generative adversarial network (GAN) model, or any other suitable type of model. Exemplary CNN models may include a Fully Convolutional Network, such as a V-NET model, a U-NET model, etc. Exemplary GAN models may include a pix2pix model, a Wasserstein GAN (WGAN) model, a circle GAN model, etc. In some embodiments, the second acquisition module 1720 may obtain the trained machine learning model from one or more components of the imaging system 100 (e.g., the storage device 130, the terminals(s) 140) or an external source via a network (e.g., the network 150). In some embodiments, the trained machine learning model may be generated according to a machine learning algorithm. In some embodiments, the trained machine learning model may be generated by a computing device (e.g., the processing device 120) by performing a process (e.g., process 2000) for generating a trained machine learning model disclosed herein. More descriptions regarding the generation of the trained machine learning model may be found in FIG. 20 and the descriptions thereof.

The scatter correction module 1730 may be configured to determine, based on the trained machine learning model and the image data, corrected image data of the subject corresponding to the radiation source for one of a plurality of radiation sources. The corrected image data may include an image quality higher than an image quality of the image data caused by the scatter data (i.e., the scatter distribution) included in the image data. That is, the corrected image data may be the image data of the subject after scatter correction. In some embodiments, the scatter correction module 1730 may determine a scatter distribution associated with the subject by inputting the image data into the trained machine learning model. The scatter correction module 1730 may determine, based on the scatter distribution and the image data, the corrected image data. In some embodiments, the scatter correction module 1730 may determine the corrected image data by inputting the image data into the trained machine learning model.

It should be noted that the above description is merely provided for the purposes of illustration, and not intended to limit the scope of the present disclosure. Apparently, for persons having ordinary skills in the art, multiple variations and modifications may be conducted under the teachings of the present disclosure. However, those variations and modifications do not depart from the scope of the present disclosure. For example, the first acquisition module 1710 and the second acquisition module 1720 may be integrated into one single module.

FIG. 18 is a schematic diagram illustrating an exemplary process for determining target image data of a subject according to some embodiments of the present disclosure. In some embodiments, process 1800 may be implemented as a set of instructions (e.g., an application) stored in the storage device 130, storage 520, or storage 690. The processing device 120, the processor 510, and/or the CPU 640 may execute the set of instructions, and when executing the instructions, the processing device 120, the processor 510, and/or the CPU 640 may be configured to perform the process 1800. The operations of the illustrated process presented below are intended to be illustrative. In some embodiments, the process 1800 may be accomplished with one or more additional operations not described and/or without one or more of the operations discussed. Additionally, the order of the operations of the process 1800 illustrated in FIG. 18 and described below is not intended to be limiting.

In 1810, for one of a plurality of radiation sources, the processing device 120 (e.g., the first acquisition module 1710) may obtain image data of a subject acquired by an imaging device via scanning the subject based on radiation beams emitted by the radiation source. The image data may include scatter data caused by a scattering of at least a portion of the radiation beams passing through the subject.

For example, for one of the plurality of radiation sources configured with a beam stop array, the image data of the subject may be obtained by the imaging device when the beam stop array is not arranged on the path of radiation beams emitted by the radiation source. As another example, for one of the plurality of radiation sources not configured with a beam stop array, the image data of the subject may be obtained by the imaging device via scanning the subject. The image data may be the same as or similar to the second image data or the fourth image data as described in FIG. 16.

More descriptions regarding obtaining the image data of the subject may be found in FIG. 16 and the descriptions thereof.

In 1820, for one of the plurality of radiation sources, the processing device 120 (e.g., the second acquisition module 1720) may obtain a trained machine learning model.

In some embodiments, the trained machine learning model may be a process or an algorithm that is configured to processing the image data of the subject. In some embodiments, the trained machine learning model may include a convolutional neural network (CNN) model, a generative adversarial network (GAN) model, or any other suitable type of model. Exemplary CNN models may include a Fully Convolutional Network, such as a V-NET model, a U-NET model, etc. Exemplary GAN models may include a pix2pix model, a Wasserstein GAN (WGAN) model, a circle GAN model, etc.

In some embodiments, the processing device 120 (e.g., the sixth obtaining module 1820) may obtain the trained machine learning model from one or more components of the imaging system 100 (e.g., the storage device 130, the terminals(s) 140) or an external source via a network (e.g., the network 150). For example, the trained machine learning model may be previously generated by a computing device (e.g., the processing device 120 or a processing device that is different from the processing device 120), and stored in a storage device (e.g., the storage device 130, the storage 520, and/or the storage 690) of the imaging system 100. The processing device 120 may access the storage device and retrieve the trained machine learning model. In some embodiments, the trained machine learning model may be generated according to a machine learning algorithm. The machine learning algorithm may include an artificial neural network algorithm, a deep learning algorithm, a decision tree algorithm, an association rule algorithm, an inductive logic programming algorithm, a support vector machine algorithm, a clustering algorithm, a Bayesian network algorithm, a reinforcement learning algorithm, a representation learning algorithm, a similarity and metric learning algorithm, a sparse dictionary learning algorithm, a genetic algorithm, a rule-based machine learning algorithm, or the like, or any combination thereof. The machine learning algorithm used to generate the trained machine learning model may be a supervised learning algorithm, a semi-supervised learning algorithm, an unsupervised learning algorithm, etc. In some embodiments, the trained machine learning model may be generated by a computing device (e.g., the processing device 120) by performing a process (e.g., process 2000) for generating a trained machine learning model disclosed herein. More descriptions regarding the generation of the trained machine learning model may be found in FIG. 20 and the descriptions thereof.

In 1830, for one of a plurality of radiation sources, the processing device 120 (e.g., the scatter correction module 1730) may determine, based on the trained machine learning model and the image data, corrected image data of the subject corresponding to the radiation source.

The corrected image data may include an image quality higher than an image quality of the image data caused by the scatter data (i.e., the scatter distribution) included in the image data. That is, the corrected image data may be the image data of the subject after scatter correction.

In some embodiments, the processing device 120 (e.g., the scatter correction module 1730) may determine a scatter distribution associated with the subject by inputting the image data into the trained machine learning model. For example, the processing device 120 may input the image data of the subject into the trained machine learning model. An output result may be generated by the trained machine learning model. The output result of the trained machine learning model may include the scatter distribution associated with the subject. The processing device 120 may determine, based on the scatter distribution and the image data, the corrected image data. For example, the corrected image data may be determined by subtracting the scatter distribution associated with the subject from the image data of the subject.

In some embodiments, the processing device 120 (e.g., the scatter correction module 1730) may determine the corrected image data by inputting the image data into the trained machine learning model. For example, the processing device 120 may input the image data of the subject into the trained machine learning model. An output result may be generated by the trained machine learning model. The output result of the trained machine learning model may include the corrected image data of the subject.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted and/or one or more additional operations may be added. For example, operation 1810 and operation 1820 may be combined into a single operation. As another example, one or more other optional operations (e.g., a storing operation) may be added elsewhere in the process 1800. In the storing operation, the processing device 120 may store information and/or data (e.g., the image data of the subject, the scatter distribution, the corrected image data, etc.) associated with the medical system 100 in a storage device (e.g., the storage device 130) disclosed elsewhere in the present disclosure.

Figure 19:
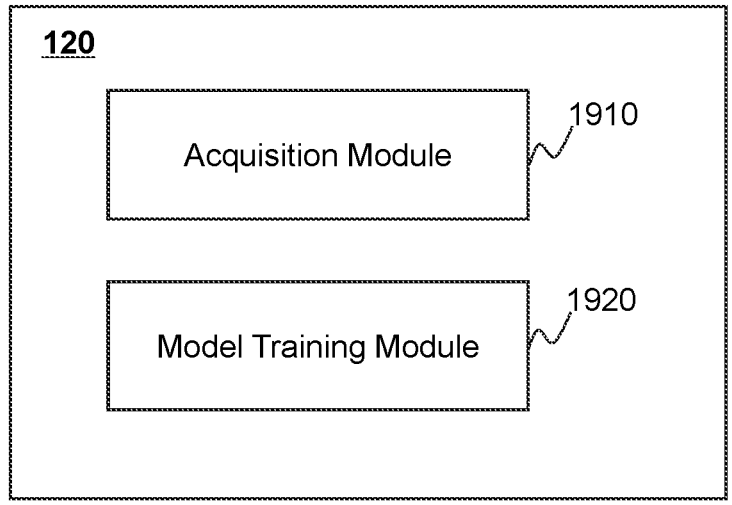
FIG. 19 is a block diagram illustrating an exemplary processing device according to some embodiments of the present disclosure.

FIG. 19 is a block diagram illustrating an exemplary processing device according to some embodiments of the present disclosure. In some embodiments, processing device 120 may be implemented on a computing device 500 (e.g., the processor 510) illustrated in FIG. 5 or a CPU 640 as illustrated in FIG. 6. As illustrated in FIG. 19, the processing device 120 may include an acquisition module 1910 and a model training module 1920. Each of the modules described above may be a hardware circuit that is designed to perform certain actions, e.g., according to a set of instructions stored in one or more storage media, and/or any combination of the hardware circuit and the one or more storage media.

The acquisition module 1910 may be configured to obtain a plurality of training samples. In some embodiments, each of the plurality of training samples may include image data of a sample subject including scatter data and a reference scatter distribution included in the image data of the sample subject. The reference scatter distribution included in the image data of the sample subject may be also referred to as a training label. In some embodiments, each of the plurality of training samples may include image data of a sample subject including scatter data and corrected image data (also referred to as reference image data) of the sample subject that has been performed scatter correction. The corrected image data of the sample subject may be also referred to as a training label. In some embodiments, the sample subject corresponding to one or more of the plurality of training samples may be a subject as described elsewhere in the present disclosure (e.g., FIGS. 1, 8, 16, 18, and the descriptions thereof). In some embodiments, the plurality of training samples may correspond to one of the at least a portion of the plurality of radiation sources. The plurality of training samples may be acquired based on the one of the at least a portion of the plurality of radiation sources. In some embodiments, the plurality of training samples may correspond to the at least a portion of the plurality of radiation sources. The plurality of training samples may be acquired based on the at least a portion of the plurality of radiation sources. In some embodiments, a training sample may be previously generated and stored in a storage device (e.g., the storage device 130, the storage 520, the storage 690, or an external database). The acquisition module 1910 may retrieve the training sample directly from the storage device. In some embodiments, at least a portion of a training sample may be generated by the acquisition module 1910.

The model training module 1920 may be configured to train a preliminary machine learning model via performing multiple iterations. The trained machine learning model may be generated by training the preliminary machine learning model. Each iteration may include updating parameter values of the preliminary machine learning model based on a difference between the reference scatter distribution and an estimated scatter distribution generated by the preliminary machine learning model based on the inputted image data. In the training of the preliminary machine learning model, the model training module 1920 may iteratively update the parameter value(s) of the preliminary machine learning model based on the plurality of training samples. The updating of the preliminary learning parameters of the machine learning model may be also referred to as updating the preliminary machine learning model. For example, the model training module 1920 may update the model parameter(s) of the preliminary machine learning model by performing one or more iterations until a termination condition is satisfied. The termination condition may indicate whether the preliminary machine learning model is sufficiently trained. The termination condition may relate to a cost function or an iteration count of the training process. In response to a determination that the termination condition is satisfied, the model training module 1920 may designate the machine learning model with the parameter values updated in the last iteration as the trained machine learning model (e.g., the trained machine learning model). On the other hand, in response to a determination that the termination condition is not satisfied, the model training module 1920 may update at least some of the parameter values of the preliminary machine learning model based on the assessment result. The model training module 1920 may perform the next iteration until the termination condition is satisfied. In the next iteration, the model training module 1920 may obtain multiple groups of training samples in another batch. After the termination condition is satisfied in a certain iteration, the preliminary machine learning model in the certain iteration having the updated value(s) of the learning parameter(s) may be designated as the trained machine learning model (e.g., the trained machine learning model).

Figure 20:
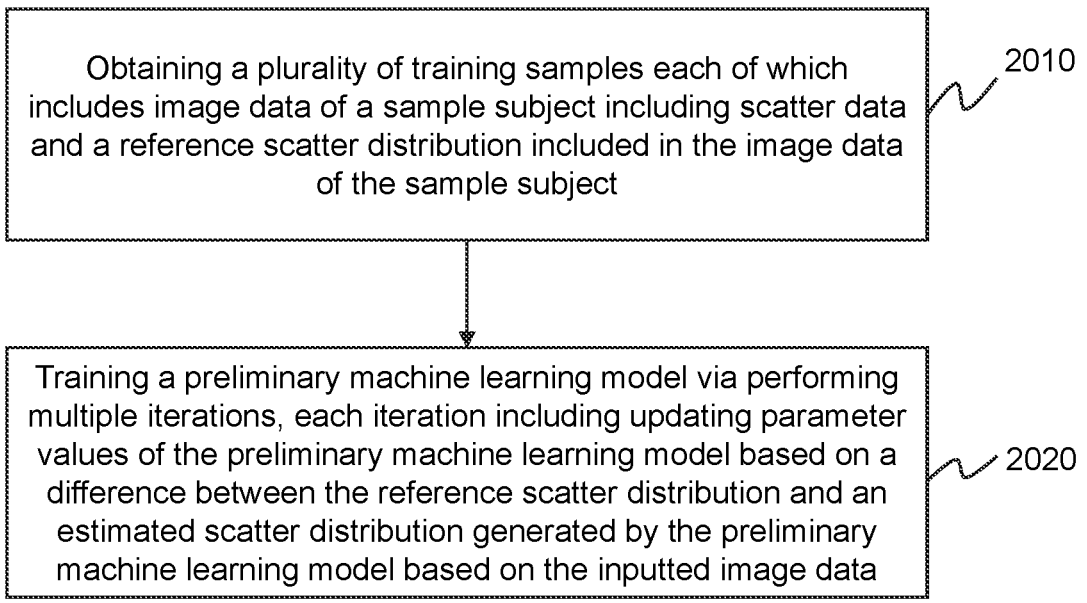
FIG. 20 is a schematic flowchart illustrating an exemplary training process of a trained machine learning model according to some embodiments of the present disclosure.

It should be noted that the above description is merely provided for the purposes of illustration, and not intended to limit the scope of the present disclosure. Apparently, for persons having ordinary skills in the art, multiple variations and modifications may be conducted under the teachings of the present disclosure. However, those variations and modifications do not depart from the scope of the present disclosure. For example, FIG. 20 is a schematic flowchart illustrating an exemplary training process of a trained machine learning model according to some embodiments of the present disclosure. In some embodiments, process 2000 may be implemented as a set of instructions (e.g., an application) stored in the storage device 130, storage 520, or storage 690. The processing device 120, the processor 510, and/or the CPU 640 may execute the set of instructions, and when executing the instructions, the processing device 120, the processor 510, and/or the CPU 640 may be configured to perform the process 2000. The operations of the illustrated process presented below are intended to be illustrative. In some embodiments, the process 2000 may be accomplished with one or more additional operations not described and/or without one or more of the operations discussed. Additionally, the order of the operations of process 2000 illustrated in FIG. 20 and described below is not intended to be limiting. In some embodiments, a training process of the trained machine learning model as described in connection with operations 1820 in FIG. 18 may be performed according to the process 2000.

In 2010, the processing device 120 (e.g., the acquisition module 1910) may obtain a plurality of training samples.

In some embodiments, each of the plurality of training samples may include image data of a sample subject including scatter data and a reference scatter distribution included in the image data of the sample subject. The reference scatter distribution included in the image data of the sample subject may be also referred to as a training label.

In some embodiments, each of the plurality of training samples may include image data of a sample subject including scatter data and corrected image data (also referred to as reference image data) of the sample subject that has been performed scatter correction. The corrected image data of the sample subject may be also referred to as a training label.

In some embodiments, the sample subject corresponding to one or more of the plurality of training samples may be a subject as described elsewhere in the present disclosure (e.g., FIGS. 1, 8, 16, 18, and the descriptions thereof). In some embodiments, the plurality of training samples may correspond to one of the at least a portion of the plurality of radiation sources. The plurality of training samples may be acquired based on the one of the at least a portion of the plurality of radiation sources. For example, the image data in each of the plurality of training samples may be acquired by the one of the at least a portion of the plurality of radiation sources emitting radiation beams to scan the sample subject. That is, each of the at least a portion of the plurality of radiation sources may correspond to a trained machine learning model. In some embodiments, the plurality of training samples may correspond to the at least a portion of the plurality of radiation sources. The plurality of training samples may be acquired based on the at least a portion of the plurality of radiation sources. For example, the image data in the plurality of training samples may be acquired by the at least a portion of the plurality of radiation sources emitting radiation beams to scan the sample subject. That is, the trained machine learning model may be applied to any of the at least a portion of the plurality of radiation sources.

In some embodiments, a training sample may be previously generated and stored in a storage device (e.g., the storage device 130, the storage 520, the storage 690, or an external database). The processing device 120 may retrieve the training sample directly from the storage device. In some embodiments, at least a portion of a training sample may be generated by the processing device 120. For example, for one of the at least a portion of the plurality of radiation sources, the processing device 120 may obtain the image data (e.g., the second image data or the fourth image data as described in FIG. 16) of the sample subject acquired by the imaging device when the beam stop array is not arranged on a path of radiation beams emitted by the radiation source, and obtain first image data of the sample subject acquired by the imaging device when the beam stop array is arranged on a path of radiation beams emitted by the radiation source. The processing device 120 may determine, based on the image data (e.g., the second image data or the fourth image data as described in FIG. 16) of the sample subject and the first image data, the reference scatter distribution associated with the sample subject included in the image data of the sample subject. As another example, for one of the at least a portion of the plurality of radiation sources, the processing device 120 may obtain the image data of the sample subject acquired by the imaging device when the beam stop array is not arranged on a path of radiation beams emitted by the radiation source, and obtain first image data of the sample subject acquired by the imaging device when the beam stop array is arranged on a path of radiation beams emitted by the radiation source. Additionally or alternatively, the processing device 120 may determine, based on the image data of the sample subject and the first image data, the corrected image data of the sample subject.

In 2020, the processing device 120 (e.g., the model training module 1920) may train a preliminary machine learning model via performing multiple iterations.

The trained machine learning model may be generated by training the preliminary machine learning model. In some embodiments, the preliminary machine learning model to be trained may include a deep learning model (e.g., a convolutional neural network (CNN) model, a deep belief nets (DBN) machine learning model, a stacked auto-encoder network), a recurrent neural network (RNN) model, a long short term memory (LSTM) network model, a fully convolutional neural network (FCN) model, a generative adversarial network (GAN) model, a backpropagation (BP) machine learning model, a radial basis function (RBF) machine learning model, an Elman machine learning model, or the like, or any combination thereof. It should be noted that the descriptions of the machine learning model in the present disclosure are merely provided for illustration, and not intended to limit the scope of the present disclosure. In some embodiments, the preliminary machine learning model may include a multi-layer structure. For example, the preliminary machine learning model may include an input layer, an output layer, and one or more hidden layers between the input layer and the output layer. In some embodiments, the hidden layers may include one or more convolution layers, one or more rectified-linear unit layers (ReLU layers), one or more pooling layers, one or more fully connected layers, or the like, or any combination thereof. As used herein, a layer of a model may refer to an algorithm or a function for processing input data of the layer. Different layers may perform different kinds of processing on their respective input. A successive layer may use output data from a previous layer of the successive layer as input data. In some embodiments, the convolutional layer may include a plurality of kernels, which may be used to extract a feature. In some embodiments, each kernel of the plurality of kernels may filter a portion (i.e., a region). The pooling layer may take an output of the convolutional layer as an input. The pooling layer may include a plurality of pooling nodes, which may be used to sample the output of the convolutional layer, so as to reduce the computational load of data processing and accelerate the speed of data processing speed. In some embodiments, the size of the matrix representing the inputted data may be reduced in the pooling layer. The fully connected layer may include a plurality of neurons. The neurons may be connected to the pooling nodes in the pooling layer. In the fully connected layer, a plurality of vectors corresponding to the plurality of pooling nodes may be determined based on a training sample, and a plurality of weighting coefficients may be assigned to the plurality of vectors. The output layer may determine an output based on the vectors and the weighting coefficients obtained from the fully connected layer.

In some embodiments, each of the layers may include one or more nodes. In some embodiments, each node may be connected to one or more nodes in a previous layer. The number of nodes in each layer may be the same or different. In some embodiments, each node may correspond to an activation function. As used herein, an activation function of a node may define an output of the node given input or a set of inputs. In some embodiments, each connection between two of the plurality of nodes in the preliminary machine learning model may transmit a signal from one node to another node. In some embodiments, each connection may correspond to a weight. As used herein, a weight corresponding to a connection may be used to increase or decrease the strength or impact of the signal at the connection.

The preliminary machine learning model may include a plurality of parameters, such as architecture parameters, learning parameters, etc. Exemplary architecture parameters of the machine learning model may include the size of a kernel of a layer, the total count (or number) of layers, the count (or number) of nodes in each layer, a learning rate, a batch size, an epoch, etc. Exemplary learning parameters may include a connected weight between two connected nodes, a bias vector relating to a node, etc.). Before the training, the preliminary machine learning model may have one or more initial parameter values. In the training of the preliminary machine learning model, learning parameters of the preliminary machine learning model may be updated. Before the updating process, values of the learning parameters of the preliminary machine learning model may be initialized. For example, the connected weights and/or the bias vector of nodes of the preliminary machine learning model may be initialized by assigning random values in a range, e.g., the range from −1 to 1. As another example, all the connected weights of the preliminary machine learning model may be assigned the same value in the range from −1 to 1, for example, 0. As still an example, the bias vector of nodes in the preliminary machine learning model may be initialized by assigning random values in a range from 0 to 1. In some embodiments, the parameters of the preliminary machine learning model may be initialized based on a Gaussian random algorithm, a Xavier algorithm, etc.

Each iteration may include updating parameter values of the preliminary machine learning model based on a difference between the reference scatter distribution and an estimated scatter distribution generated by the preliminary machine learning model based on the inputted image data.

In the training of the preliminary machine learning model, the processing device 120 may iteratively update the parameter value(s) of the preliminary machine learning model based on the plurality of training samples. The updating of the preliminary learning parameters of the machine learning model may be also referred to as updating the preliminary machine learning model. For example, the processing device 120 may update the model parameter(s) of the preliminary machine learning model by performing one or more iterations until a termination condition is satisfied. The termination condition may indicate whether the preliminary machine learning model is sufficiently trained. The termination condition may relate to a cost function or an iteration count of the training process. For example, the processing device 120 may determine a loss function of the preliminary machine learning model and determine a value of the cost function based on the difference between an estimated output and an actual output or desired output (i.e., reference output). Further, the processing device 120 may determine the termination condition is satisfied if the value of the loss function is less than a threshold. The threshold may be default settings of the imaging system 100 or may be adjustable under different situations. As another example, the termination condition may be satisfied if the value of the cost function converges. The convergence may be deemed to have occurred if the variation of the values of the cost function in two or more consecutive iterations is smaller than a threshold (e.g., a constant). As still another example, the processing device 120 may determine the termination condition is satisfied if a specified number (or count) of iterations are performed in the training process. In response to a determination that the termination condition is satisfied, the processing device 120 may designate the machine learning model with the parameter values updated in the last iteration as the trained machine learning model (e.g., the trained machine learning model). On the other hand, in response to a determination that the termination condition is not satisfied, the processing device 120 may update at least some of the parameter values of the preliminary machine learning model based on the assessment result. For example, the processing device 120 may update the value(s) of the learning parameter(s) of the preliminary machine learning model based on the value of the loss function according to, for example, a backpropagation algorithm. The processing device 120 may perform the next iteration until the termination condition is satisfied. In the next iteration, the processing device 120 may obtain multiple groups of training samples in another batch. The size of the batch may refer to a group count or number of the multiple groups of training samples. After the termination condition is satisfied in a certain iteration, the preliminary machine learning model in the certain iteration having the updated value(s) of the learning parameter(s) may be designated as the trained machine learning model (e.g., the trained machine learning model).

It should be noted that the above description is merely provided for illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted and/or one or more additional operations may be added. For example, one or more other optional operations (e.g., a storing operation) may be added elsewhere in the process 2000. In the storing operation, the processing device 120 may store information and/or data (e.g., parameter values, etc.) associated with the training of the preliminary machine learning model in a storage device (e.g., the storage device 130) disclosed elsewhere in the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer-readable media having computer-readable program code embodied thereon.

A non-transitory computer-readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer-readable signal medium may be any computer-readable medium that is not a computer-readable storage medium and that may communicate, propagate, or transport a program for use by or in connection with an instruction execution system, apparatus, or device. Program code embodied on a computer-readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python, or the like, conventional procedural programming languages, such as the "C" programming language, Visual Basic, Fortran, Perl, COBOL, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof to streamline the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate" or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A system for imaging via an imaging device including a plurality of radiation sources, each of at least a portion of the plurality of radiation sources being configured with a beam stop array that is configured to block at least a portion of radiation beams emitted by the radiation source, and the plurality of radiation sources including a target portion in which each radiation source is not configured with a beam stop array, the system comprising:
at least one storage device including a set of instructions; and
at least one processor in communication with the at least one storage device, wherein when executing the set of instructions, the at least one processor is directed to perform operations including:
for one of the at least a portion of the plurality of radiation sources,
obtaining first image data of a subject acquired by the imaging device when the beam stop array is arranged on a path of radiation beams emitted by the radiation source;
obtaining second image data of the subject acquired by the imaging device when the beam stop array is not arranged on the path of radiation beams emitted by the radiation source;
determining, based on the first image data, a scatter distribution associated with the subject included in the second image data; and
determining, based on the scatter distribution and the second image data, third image data of the subject corresponding to each of the at least a portion of the plurality of radiation sources; and
for a radiation source in the target portion,
obtaining fourth image data of the subject corresponding to the radiation source in the target portion acquired by the imaging device via scanning the subject; and
determining, based on the fourth image data and the scatter distribution corresponding to at least part of the at least a portion of the plurality of radiation sources, third image data of the subject corresponding to the radiation source in the target portion.

2. The system of claim 1, wherein the beam stop array includes a support and multiple elements each of which includes a material with an attenuation coefficient exceeding an attenuation coefficient of a material of the support.

3. The system of claim 1, wherein the determining, based on the first image data, a scatter distribution associated with the subject includes:
performing an interpolation operation on the first image data to obtain the scatter distribution.

4. The system of claim 1, wherein a radiation dose of the first image data is less than a radiation dose of the second image data, and the determining, based on the scatter distribution and the second image data, third image data of the subject corresponding to each of the at least a portion of the plurality of radiation sources radiation source includes:
determining a ratio of the radiation dose of the second image data and the radiation dose of the first image data; and
determining, based on the ratio, the scatter distribution, and the second image data, the third image data.

5. The system of claim 1, wherein the determining, based on the fourth image data and the scatter distribution corresponding to at least part of the at least a portion of the plurality of radiation sources, third image data of the subject corresponding to the radiation source in the target portion includes:
determining an estimated scanner distribution included in the fourth image data based on one or more scatter distributions that are determined based on the first image data corresponding to one or more reference radiation sources; and
determining, based on the fourth image data and the scanner distribution, the third image data of the subject corresponding to the radiation source in the target portion.

6. The system of claim 5, wherein the determining an estimated scanner distribution included in the fourth image data includes:
determining the estimated scanner distribution included in the fourth image data by performing an interpolation operation on the one or more scatter distributions.

7. The system of claim 5, wherein the operations further include:
determining, based on the third image data of the subject corresponding to each of the plurality of radiation sources, target image data of the subject.

8. A system for imaging via an imaging device including a plurality of radiation sources and a detector, each of at least a portion of the plurality of radiation sources being configured with a beam stop array that is configured to block at least a portion of radiation beams emitted by the radiation source, the system comprising:
at least one storage device including a set of instructions; and
at least one processor in communication with the at least one storage device, wherein when executing the set of instructions, the at least one processor is directed to perform operations including:
for one of the plurality of radiation sources,
obtaining image data of the subject acquired by the imaging device via scanning the subject based on radiation beams emitted by the radiation source, the image data including scatter data caused by a scattering of at least a portion of the radiation beams passing through the subject;
obtaining a trained machine learning model;
determining, based on the trained machine learning model and the image data, target image data of the subject corresponding to the radiation source, the target image data including an image quality higher than an image quality of the image data caused by the scatter data included in the image data, wherein the trained machine learning is provided by a process including:
obtaining a plurality of training samples each of which includes image data of a sample subject including scatter data and a reference scatter distribution included in the image data of the sample subject;
training a preliminary machine learning model via performing multiple iterations, each iteration including updating parameter values of the preliminary machine learning model based on a difference between the reference scatter distribution and an estimated scatter distribution generated by the preliminary machine learning model based on the inputted image data.

9. The system of claim 8, wherein the determining, based on the trained machine learning model and the image data, target image data of the subject corresponding to the radiation source includes:
- determining a scatter distribution associated with the subject by inputting the image data into the trained machine learning model; and
- determining, based on the scatter distribution and the image data, the target image data.

10. The system of claim 8, wherein the determining, based on the trained machine learning model and the image data, target image data of the subject corresponding to the radiation source includes:
- determining the target image data by inputting the image data into the trained machine learning model.

11. The system of claim 8, wherein the obtaining a plurality of training samples including:
- for one of the at least a portion of the plurality of radiation sources,
  - obtaining the image data of the sample subject acquired by the imaging device when the beam stop array is not arranged on a path of radiation beams emitted by the radiation source;
  - obtaining first image data of the sample subject acquired by the imaging device when the beam stop array is arranged on a path of radiation beams emitted by the radiation source;
  - determining, based on the first image data, the reference scatter distribution associated with the sample subject included in the image data of the sample subject.

12. A system for imaging via an imaging device including a plurality of radiation sources and a detector, the system comprising:
- for each of at least a portion of the plurality of radiation sources,
  - obtaining image data of a subject acquired by the imaging device via scanning the subject based on radiation beams emitted by the radiation source;
  - obtaining a calibration model corresponding to the radiation source, the calibration model indicating a transform relationship between a position of each pixel in the image data and a position of a portion of the subject represented by the pixel in a space, wherein the calibration model is determined based on a reference object including multiple elements, the elements are arranged in a first layer and a second layer, each element in the first layer corresponds to one element in the second layer, and two corresponding elements in the first and second layers are aligned in the vertical direction such that the two elements are not located at a same projection direction or transmission path of a radiation beam of the radiation source; and
  - determining, based on the image data of the subject, target image data of the subject using the calibration model.

13. The system of claim 12, wherein the determining, based on the image data of the subject, target image data of the subject using the calibration model includes:
- performing a three-dimensional reconstruction operation on the image data corresponding to at least a portion of the plurality of radiation sources using multiple calibration models each of which corresponds to one of at least a portion of the plurality of radiation sources.

14. The system of claim 12, wherein the calibration model is provided by a process including:
- obtaining image data of the reference object acquired by the imaging device scanning the reference object, the reference object further including a support, the multiple elements being arranged on the support, each of the multiple elements including a material with an attenuation coefficient being different from an attenuation coefficient of a material of the support, the image data including representations of at least six elements among the multiple elements;
- determining a first position of each of the at least six elements in the image data;
- determining a second position of each of the at least six elements in a space where the imaging device is arranged; and
- determining, based on the first position and the second position, the calibration model.

15. The system of claim 14, wherein the determining, based on the first position and the second position, the calibration model includes:
- determining, based on the first position and the second position, multiple pairs of positions each of which includes the first position and the second position of a same element among the at least six elements; and
- determining, based on the multiple pairs of positions, the calibration model.

16. The system of claim 14, wherein one or more elements among the at least six elements are not overlapped on transmission paths of the radiation beams emitted by the radiation source.

17. The system of claim 14, wherein an interval between two adjacent elements in the at least six elements is determined based on at least one of a first distance between the radiation source and the reference object and a second distance between the radiation source and the detector of the imaging device, and the interval between two adjacent elements in the at least six elements is positively related to at least one of the first distance or the second distance.

18. The system of claim 12, wherein a center point of the reference object located at a detection region of the imaging device is aligned with a center point of the plurality of radiation sources in the vertical direction.

19. The system of claim 12, wherein
in the image data, points representing the two corresponding elements arranged in the first and second layers and aligned in the vertical direction are closer with each other than points representing the elements in the same layer.

20. The system of claim 12, wherein
elements corresponding to points with a same diameter in the image data are arranged in the same layer or have a same distance to the radiation source in the vertical direction.

* * * * *